(12) United States Patent
Oneda

(10) Patent No.: US 6,611,819 B1
(45) Date of Patent: Aug. 26, 2003

(54) ELECTRONIC MONEY APPARATUS, METHOD, CARD AND COMPUTER READABLE RECORD MEDIUM HAVING ELECTRONIC MONEY PROCESSING PROGRAM RECORDED THEREON

(75) Inventor: Hideo Oneda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/186,149

(22) Filed: Nov. 5, 1998

(30) Foreign Application Priority Data

Jun. 5, 1998 (JP) .......................... 10-156980

(51) Int. Cl.[7] .............................. G06F 17/60
(52) U.S. Cl. ..................... 705/41; 705/39; 705/35; 705/1; 705/500; 705/68; 705/69
(58) Field of Search ............... 705/41, 39, 35, 705/1, 500, 68, 69

(56) References Cited

U.S. PATENT DOCUMENTS

| | | | | |
|---|---|---|---|---|
| 4,856,062 A | * | 8/1989 | Weiss | 713/184 |
| 5,046,157 A | * | 9/1991 | Smith et al. | 340/309.15 |
| 5,461,217 A | * | 10/1995 | Claus | 235/380 |
| 5,559,313 A | * | 9/1996 | Claus et al. | 705/30 |
| 5,577,121 A | * | 11/1996 | Davis et al. | 705/67 |
| 5,621,201 A | * | 4/1997 | Langhans et al. | 235/380 |
| 5,621,796 A | * | 4/1997 | Davis et al. | 705/68 |
| 5,633,930 A | * | 5/1997 | Davis et al. | 705/68 |
| 5,649,118 A | * | 7/1997 | Carlisle et al. | 705/41 |
| 5,691,525 A | * | 11/1997 | Aoki et al. | 235/379 |
| 5,708,422 A | * | 1/1998 | Blonder et al. | 340/5.41 |
| 5,770,843 A | * | 6/1998 | Rose et al. | 235/380 |
| 5,914,472 A | * | 6/1999 | Foladare et al. | 235/380 |
| 5,982,293 A | * | 11/1999 | Everett et al. | 340/825.33 |
| 5,991,748 A | * | 11/1999 | Taskett | 705/41 |
| 6,047,270 A | * | 4/2000 | Joao et al. | 705/44 |

FOREIGN PATENT DOCUMENTS

| | | | | |
|---|---|---|---|---|
| EP | 0 619 564 A1 | * | 1/1987 | G07B/17/00 |
| EP | 0500956 A1 | | 9/1992 | |
| EP | 0778 691 A2 | | 6/1997 | |
| EP | 0778691 A3 | | 3/1998 | |
| EP | 0962875 A | * | 8/1999 | G06F/17/60 |
| WO | WO83/03018 | | 9/1983 | |

* cited by examiner

Primary Examiner—Tariq R. Hafiz
Assistant Examiner—Akiba Robinson-Boyce
(74) Attorney, Agent, or Firm—Staas & Halsey LLP

(57) ABSTRACT

An IC card incorporates a processor, a memory, etc. The memory stores therein a general electronic money balance having an unlimited use range, a specific electronic money balance having a limited use range, and available genre information defining a use range of the specific electronic money balance. A transfer processing unit serves to transfer a specified amount of money from the general electronic money balance to the specific electronic money balance between two IC cards. A settlement processing unit compares genre information acquired from a purchased commodity or a provided service with the available genre information of the IC card and, only when a coincidence has occurred, deducts the purchased amount of money from the specific electronic money balance of the IC card.

38 Claims, 18 Drawing Sheets

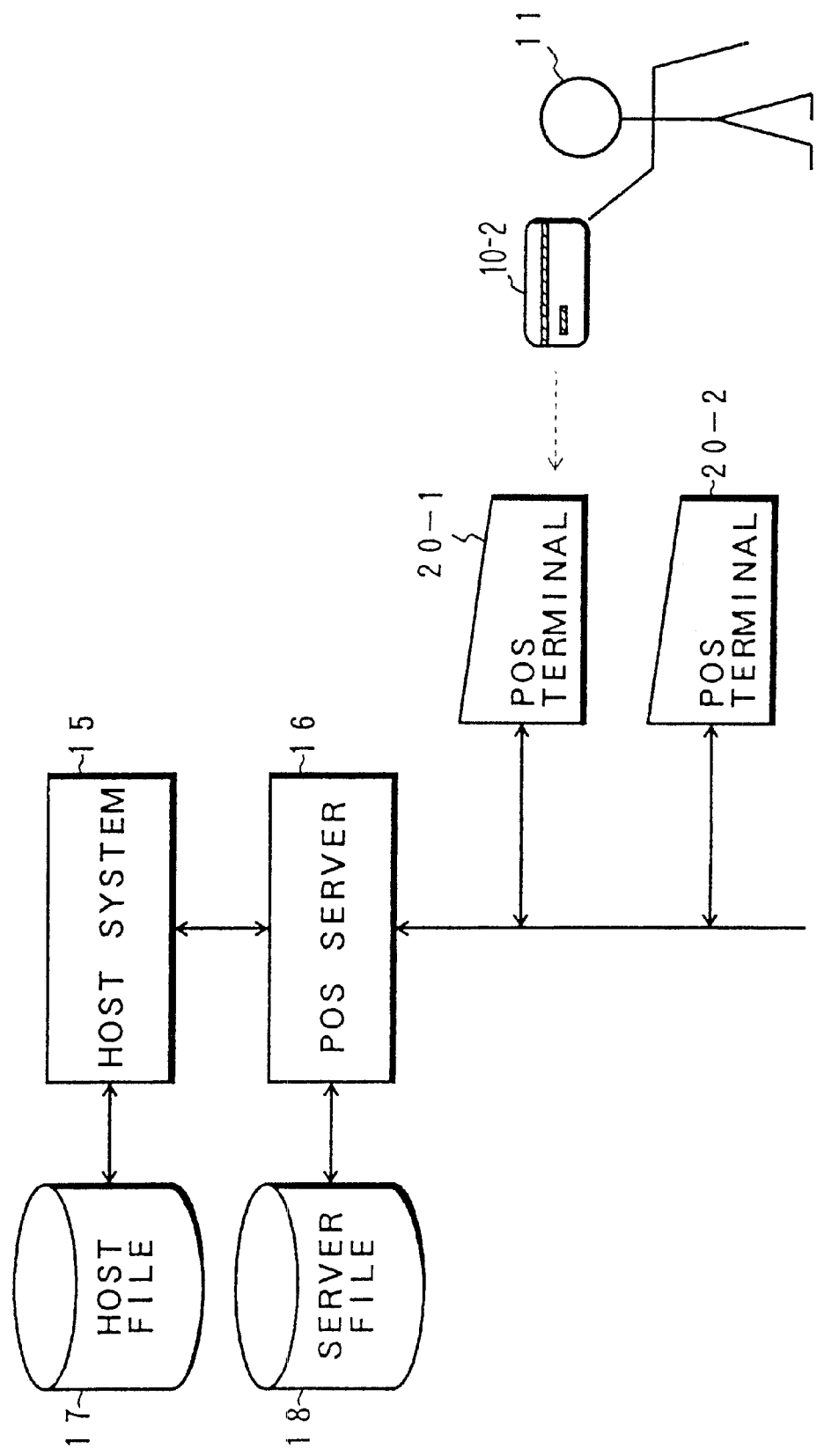

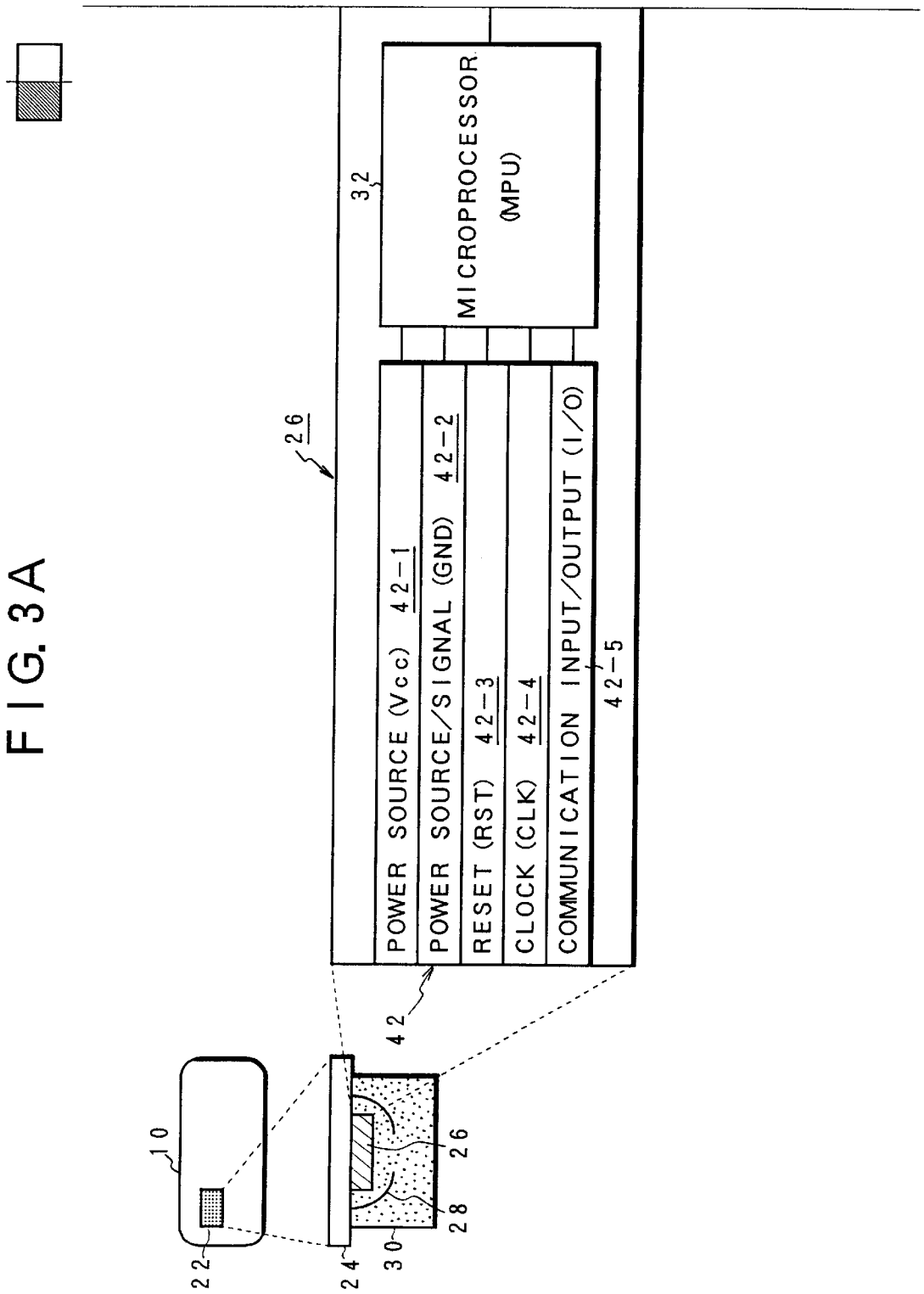

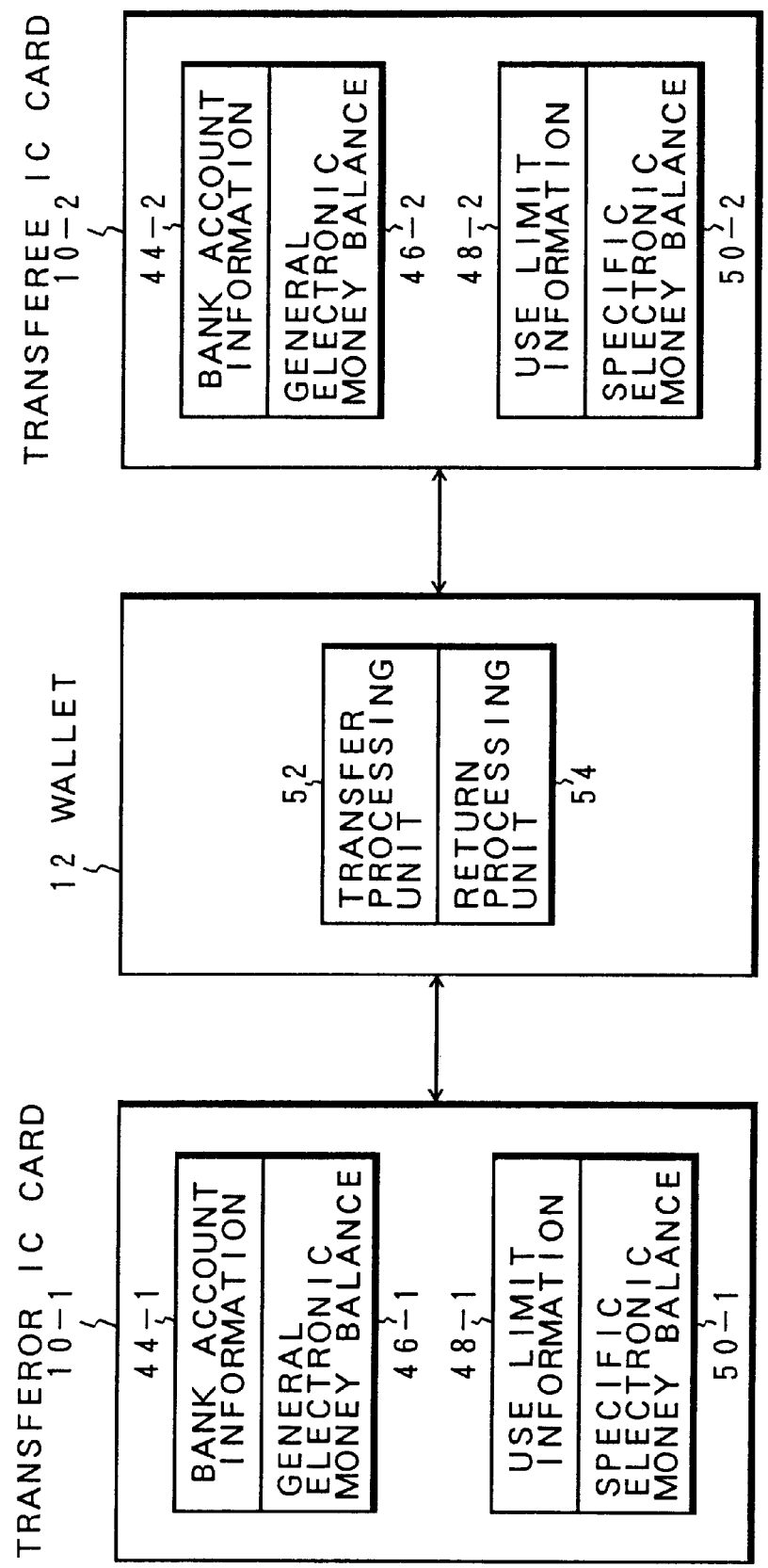

FIG. 6A 64-1

| AVAILABLE STORE NAME | AVAILABLE STORE CODE |
|---|---|
| DEPARTMENT STORE A MEMBER | 0001 |
| STORE B MEMBER | 0002 |
| SHOPPING DISTRICT C MEMBER | 0003 |

FIG. 6B 64-2

| AVAILABLE COUNTER | AVAILABLE COUNTER CODE |
|---|---|
| BOOK COUPON COUNTER | 0001 |
| STATIONERY COUNTER | 0002 |
| TOY COUNTER | 0003 |

FIG. 6C 64-3

| AVAILABLE COMMODITY GENRE | AVAILABLE COMMODITY GENRE CODE |
|---|---|
| BOOKS | 0001 |
| STATIONERY | 0002 |
| TOYS | 0003 |

FIG. 6D 64-4

| AVAILABLE COMMODITY | AVAILABLE COMMODITY CODE |
|---|---|
| REFERENCE BOOKS | 0001 |
| JUVENILE MAGAZINES | 0002 |
| NOVELS | 0003 |

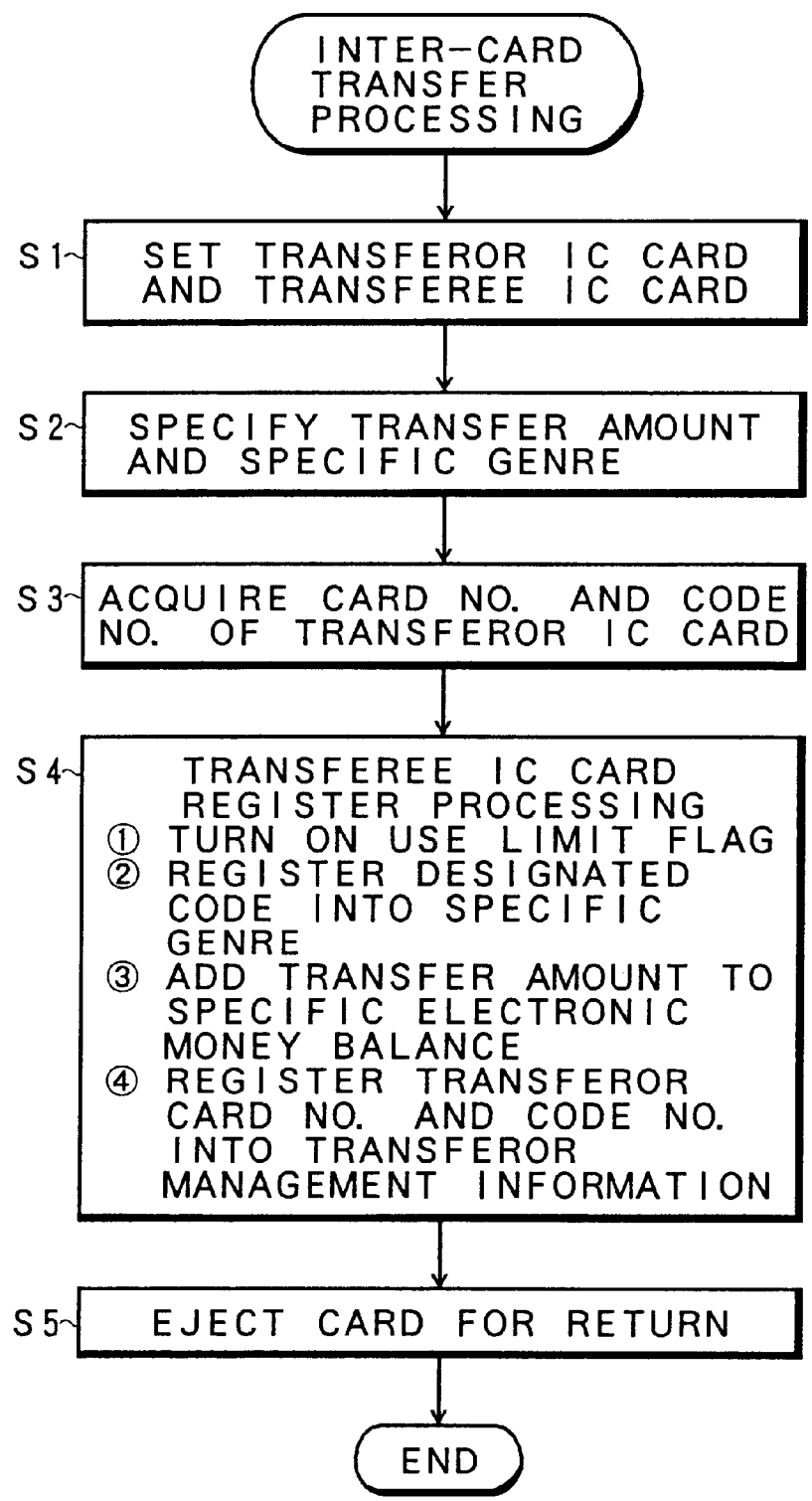

FIG. 9

Table 80:

| ITEM CODE | ITEM | CLASSIFICATION |
|---|---|---|
| 101 | SHIRT | 2 |
| 102 | SOCKS | 2 |
| 103 | NECKTIE | 2 |
| 104 | HANDKERCHIEF | 2 |
| 105 | GLOVES | 2 |
|  |  |  |

FIG. 10

Table 82:

| PLU CODE | PRICE | CLASSIFICATION |
|---|---|---|
| 4910101000013 | 3,000 | 2 |
| 4910101000018 | 500 | 2 |
| 4910101000024 | 7,500 | 2 |
| 4910101000050 | 1,200 | 2 |
| 4910101000064 | 600 | 2 |
|  |  |  |

FIG. 11

| POS NO. | MEMBER CODE | COUNTER CODE |
|---|---|---|
| 1001 | 202 | 100 |
| 1002 | 202 | 200 |
| 1003 | 202 | 300 |
| | | |

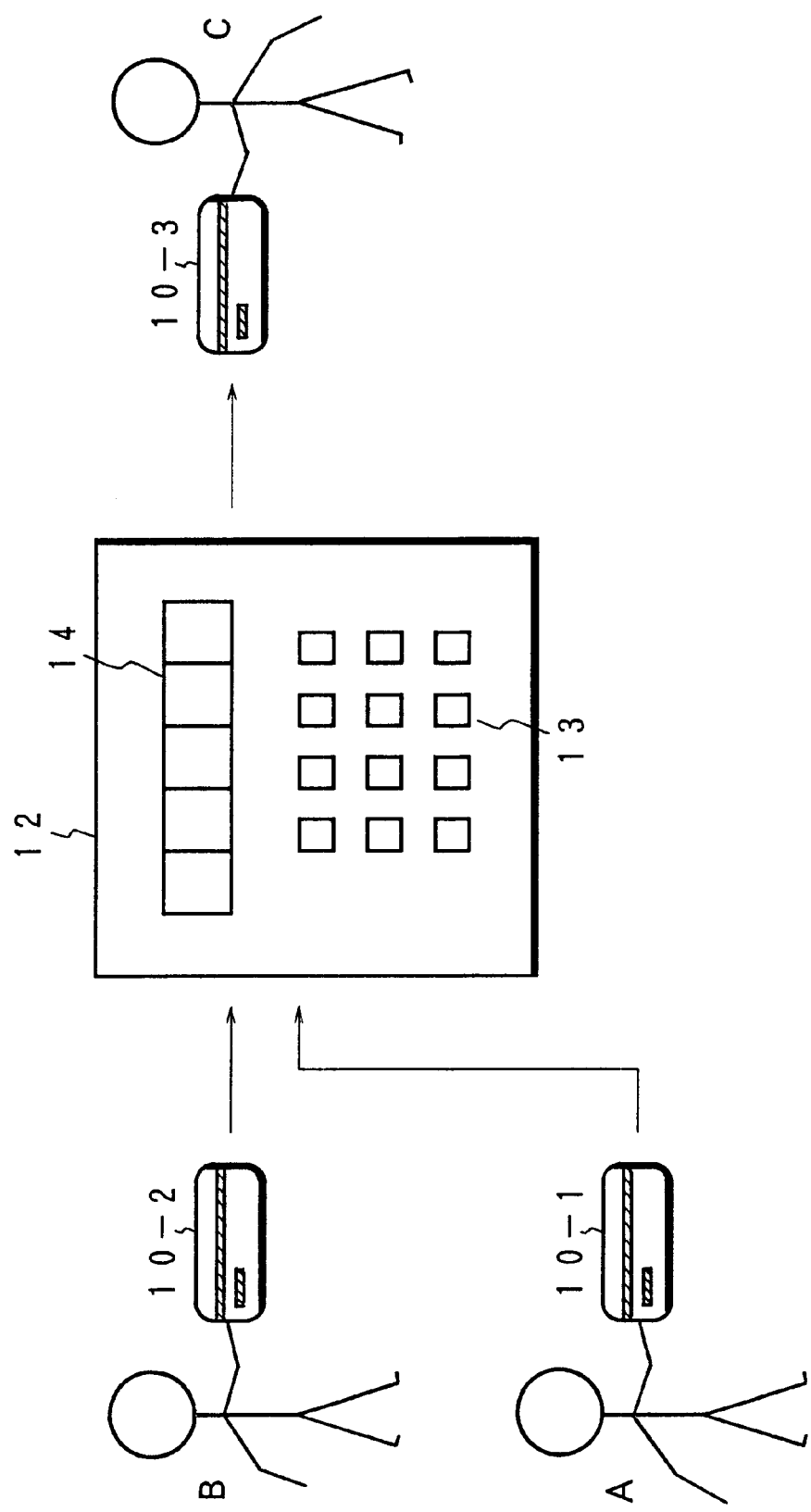

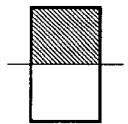
FIG. 14A
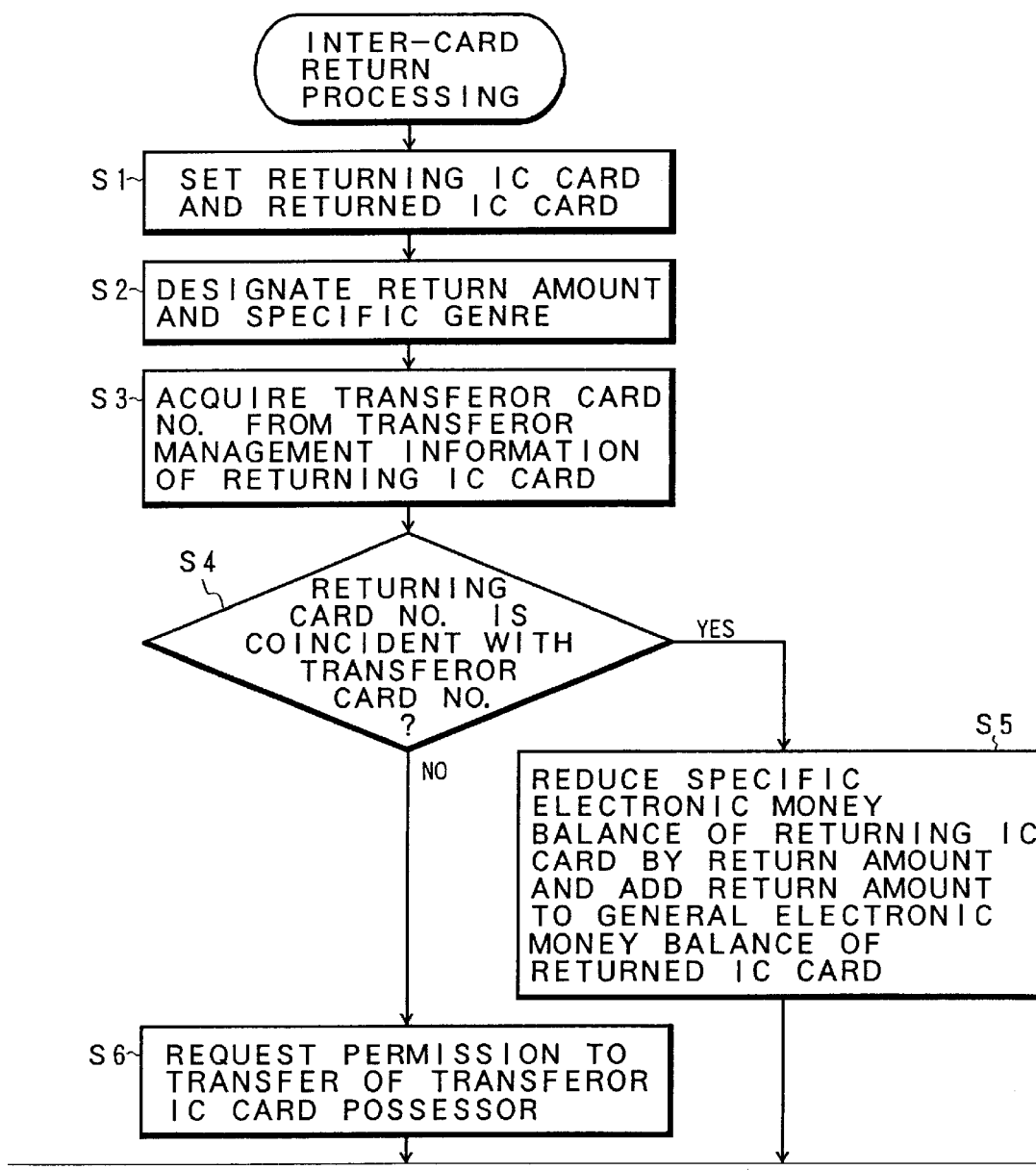

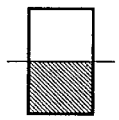
FIG. 14B
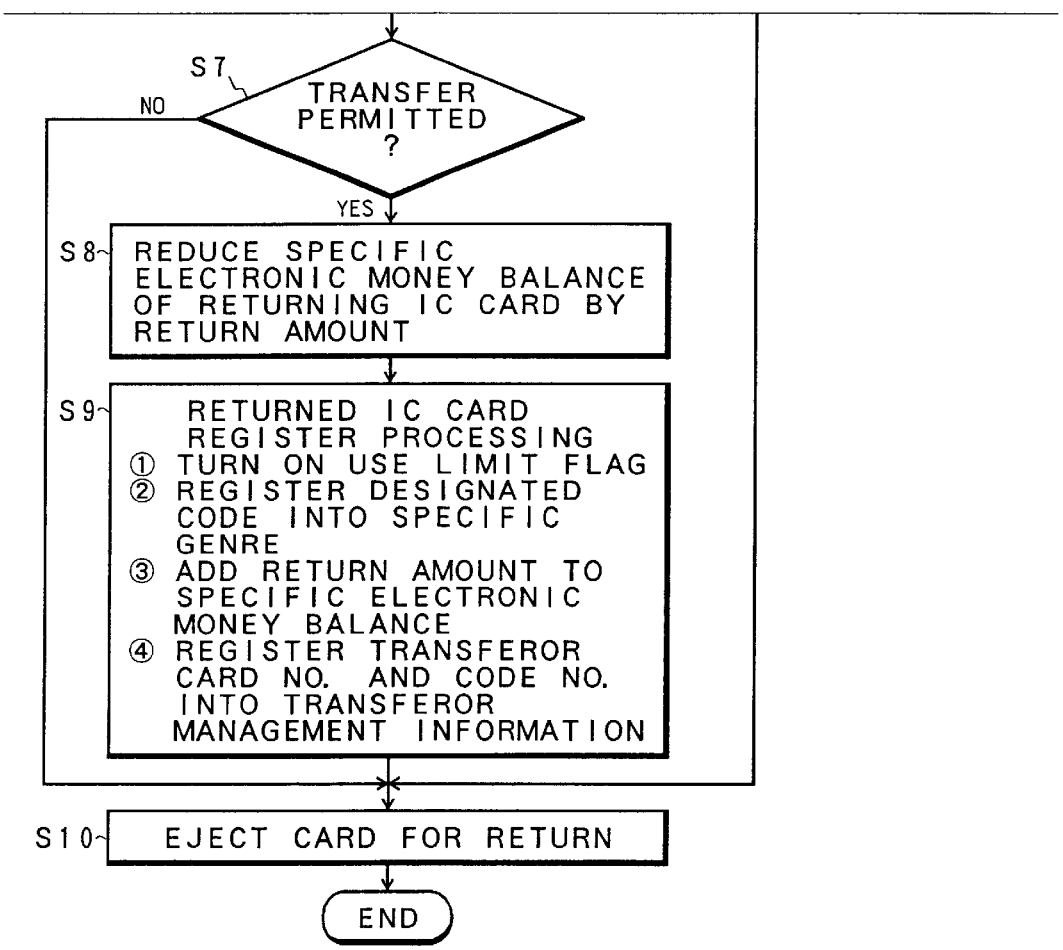

ELECTRONIC MONEY APPARATUS, METHOD, CARD AND COMPUTER READABLE RECORD MEDIUM HAVING ELECTRONIC MONEY PROCESSING PROGRAM RECORDED THEREON

BACKGROUND OF THE INVENTION

1. Field of the Invention

The present invention relates generally to an electronic money apparatus using electronic money stored in an IC card for the settlement of purchase of a commodity or provision of a service, and more particularly to an electronic money apparatus specifying a use object of the electronic money to thereby limit the use departing from the use object.

2. Description of the Related Arts

In view of safety and convenience of the settlement in transactions such as buying and selling, attention is being given to an electronic money system utilizing as cashes electronic money in the form of electronic digital data stored in IC cards, the electronic money being settlement means in lieu of conventional bills and coins. In such an electronic money system using the IC cards, possessors of the IC cards use bank terminals to withdraw a required amount of money from their bank accounts to store it as the electronic money into the respective IC cards. For the settlement of purchase of a commodity, the IC card is set in a POS terminal to deduct the purchase amount from the electronic money balance. The IC card acts also as an electronic wallet. Hence, in case of a family by way of example, a necessary amount of electronic money can be transferred from an IC card possessed by a parent to another IC card possessed by a child so as to allow the child to use it in the same manner as the case of the cashes.

However, a mere use of the electronic money stored in the IC card for the settlement of purchase of a commodity or provision of a service will not offer so much a merit as compared with the case of use of the conventional cashes. Thus, no attractive system is provided to the consumers, making difficult a wider spread and utilization of the electronic money system. It is therefore strongly desired to create a novel and effective function of application and mode of application, which can be achieved only by the electronic money system.

SUMMARY OF THE INVENTION

According to the present invention there is provided an electronic money apparatus having a novel and useful mode of application capable of specifying a use object of electronic money stored in an IC card and of limiting a use other than the use object.

The electronic money apparatus of the present invention comprises an IC card for storing electronic money therein, an electronic money transfer processing unit and a POS system acting as an electronic money settlement processing unit. The IC card has a built-in integrated circuit including a processor and a memory, the memory storing therein a general electronic money balance having an unlimited use range, a specific electronic money balance having a limited use range, and available genre information defining a use range of the specific electronic money balance. The transfer processing unit transfers a specified amount of money from the general electronic money balance to the specific electronic money balance between two IC cards. The settlement processing unit compares genre information acquired from a purchased commodity or a provided service with the available genre information of the card. When a coincidence occurs, the settlement processing unit deducts the purchased amount of money from the specific electronic money balance of the card, whereas when a non-coincidence occurs, it prohibits the deduction from the specific electronic money balance. According to such an electronic money apparatus of the present invention, in case for example a parent transfers electronic money to a child's IC card, it is possible to specify e.g., "books" as the available genre information to execute a transfer for adding a necessary amount of money to the specific electronic money balance. For this reason, even though the child has the IC card storing the electronic money, he or she can merely use the IC card for the settlement of a purchased commodity in conformity with the use object specified upon the transfer, thereby making it possible for the parent's judgment to decide the use object, imposing a secure limitation on the use diverting from the use object. It is natural that the ability to limit the use object of the transferred electronic money is applicable not only to the parent and child but also widely to conjugal, cash management in a company, etc.

In this event, the available genre information (use limit information) stored in the IC card contains a use limit flag defining the presence or absence of a use limit, and specific genre information specifying a genre of which use is permitted. The use limit flag has a flag value 0 indicative of the absence of a limit or a flag value 1 indicative of the presence of a limit. The flag value indicative of the presence of a limit comprises a plurality of flag values 1, 2, 3, . . . set in accordance with different contents of limit. The specific genre information stored in the IC card contains at least one of an available store, an available counter, an available commodity genre and an available commodity. The IC card stores, in addition to the available genre information, transferor management information containing a card number and a code number of a transferor card. At every transfer from the general electronic money balance to the specific electronic money balance, the IC card registers the transferred specific electronic money balance and the available genre information. This allows a management of the electronic money on a transfer-to-transfer basis, enabling the electronic money to be transferred from a plurality of IC cards to a specific IC card with respective use objects.

The transfer processing unit further allows between two IC cards:

I. Return of a specified amount of money from a specific electronic money balance to another specific electronic money balance; and II. Return of a specified amount of money from a specific electronic money balance to a general electronic money balance.

That is, upon a transfer of a specified amount of money from the general electronic money balance to the specific electronic money balance between two cards, the transfer processing unit registers a card number and a code number of a transferor card into transferor management information of a transferee card. If a returned card is coincident with the transferor card through a reference to the transferor management information, then the transfer processing unit returns the specified amount of money to the general electronic money balance without needing any permission in particular. This allows for example the electronic money transferred to the specific electronic money balance of the IC card possessed by the child from the parent to be returned to the IC card possessed by the parent if necessary. This return of the electronic money is a return to the transferor, so that there is no need for security such as a code number. On the contrary, if the returned card is not coincident with the transferor card, then the transfer processing unit returns the specified amount of money to the specific electronic money balance of another IC card through the acquisition of a permission for transfer based on the coincidence of collation of a code number of the transferor card with a code number of the transferor management information. In this event, a transfer is simultaneously made of the transferor management information which has been registered in a manner corresponding to the specific electronic money balance. Conveniently, this allows the specific electronic money balance to be transferred between two IC cards possessed by e.g., brothers, through the acquisition of a permission of the parent who is the possessor of the transferor card. Naturally, without any permission of the parent there is prohibited an arbitrary transfer of the specific electronic money balance between children's IC cards.

The transfer processing unit is further able to return a specified amount of money within the same card from the specific electronic money balance to the general electronic money balance. More specifically, at every transfer of a specified amount of money between two the cards from general electronic money balance to the specific electronic money balance, the transfer processing unit registers a card number and a code number of a transferor card into transferor management information of a transferee card, so that through the acquisition of a permission for transfer based on a coincidence of collation of the code number of the transferor card with a code number of the transferor management information, the transfer processing unit can return the specified amount of money within the same card from the specific electronic money balance to the general electronic money balance. When the electronic money is returned within the same IC card from the specific electronic money balance to the general electronic money balance, the use limit to the transferred electronic money is canceled allowing a free use. Thus, such a transfer within the same IC card requires a permission of the possessor of the transferor card, e.g., the parent, preventing the child from arbitrarily canceling the use limit. Upon a transfer of a specified amount of money between two the cards from general electronic money balance to the specific electronic money balance, the transfer processing unit uses a fixed value as the code number registered in the transferor management information of the transferee card. In another mode, upon a transfer of a specified amount of money between two cards from the general electronic money balance to the specific electronic money balance, the transfer processing unit varies every time the code number registered in the transferor management information of the transferee card. By varying the code number in this manner, it is prevented that for example a child memorizes the parent's code number to use it for a return from the specific electronic money balance to the general electronic money balance, thereby enhancing the security. The settlement processing unit has an item table in which are registered items, item codes and classification codes, and refers to the item table on the basis of a purchased commodity to recognize its classification code or item code, for a comparison with the available genre information of the card. The settlement processing unit may have a price look-up table in which are registered price look-up codes, prices and classification codes, and may refer to the price look-up table on the basis of a purchased commodity to recognize its classification code, for a comparison with the available genre information of the card. The settlement processing unit may have a genre management table in which are registered apparatus numbers at settlement sites, store codes and counter codes, and may refer to the genre management table on the basis of a purchased commodity to recognize its corresponding code, for a comparison with the available genre information of the card. Such a settlement processing unit is usually implemented as a function of the POS terminal of the POS system, so that if the use limit flag of the IC card is effective upon the purchase of a commodity, a deduction from the specific electronic money balance is permitted only for the purchased commodity in conformity with the use limit genre information specified, thereby realizing a use object limiting function possessed by the IC card.

According to the present invention there is provided an electronic money processing method having a novel and useful mode of application capable of specifying a use object of electronic money stored in an IC card and of limiting a use other than the use object. This electronic money processing method comprises:

a storage step for storing general electronic money balance having an unlimited use range, specific electronic money balance having a limited use range, and available genre information defining a use range of the specific money balance, into a carriable card incorporating an integrated circuit including a processor and a memory;

a transfer step for transferring a specified amount of money between two cards from the general electronic money balance to the specific electronic money balance; and a settlement step for comparing genre information acquired from a purchased commodity with the available genre information of the card and, when a coincidence occurs, deducting a purchase amount of money from the specific electronic money balance of the card and, when a non-coincidence occurs, prohibiting a deduction from the specific electronic money balance.

The details of this electronic money processing method are basically the same as those of the electronic money apparatus.

According to the present invention there is provided a carriable IC card which incorporates an integrated circuit including a processor and a memory, the IC card being characterized in that the memory stores therein a general electronic money balance having an unlimited use range, a specific electronic money balance having a limited use range, and available genre information defining a use range of the specific electronic money balance. The available genre information of the IC card contains a use limit flag defining the presence or absence of a use limit, and specific genre information specifying a genre of which use is permitted. The use limit flag has a flag value indicative of the absence of a limit or a flag value indicative of the presence of a limit. The flag value indicative of the presence of a limit comprises a plurality of flag values set in accordance with different contents of limit. The specific genre information contains at least one of an available store, an available counter, an available commodity genre and an available commodity. The IC card stores, in addition to the available genre information, transferor management information containing a card number and a code number of a transferor card.

According to the present invention there is provided an electronic money transfer apparatus, which comprises a transfer processing unit for transferring a specified amount of money between two carriable cards from a general electronic money balance having an unlimited use range to a specific electronic money balance having a limited use range, the cards each incorporating an integrated circuit including a processor and a memory, the memory storing therein the general electronic money balance, the specific electronic money balance and available genre information defining a use range of the specific electronic money balance. Upon a transfer of a specified amount of money from the general electronic money balance to the specific electronic money balance between two cards, the transfer processing unit of the electronic money transfer apparatus registers a card number and a code number of a transferor card into transferor management information of a transferee card. If, upon a return of a specified amount of money from the specific electronic money balance between two the cards, a returned card is coincident with transferor card through a reference to the transferor management information, then the transfer processing unit returns the specified amount of money intactly to the general electronic money balance. If the returned card is not coincident with the transferor card, then the transfer processing unit returns the specified amount of money from the specific electronic money balance to the general electronic money balance through the acquisition of a permission for transfer based on the coincidence of collation of an input code number of the transferor card with a code number of the transferor management information. At every transfer of a specified amount of money between two cards from the general electronic money balance to the specific electronic money balance, the transfer processing unit of the electronic money transfer apparatus registers a card number and a code number of a transferor card into transferor management information of a transferee card. Afterward, through the acquisition of a permission for transfer based on a coincidence of collation of the code number of the transferor card with a code number of the transferor management information, the transfer processing unit returns the specified amount of money within the same card from the specific electronic money balance to the general electronic money balance. Upon a transfer of a specified amount of money between two cards from the general electronic money balance to the specific electronic money balance, the transfer processing unit of the electronic money transfer apparatus uses a fixed value as the code number registered in the transferor management information of the transferee card or alternatively varies every time the code number.

According to the present invention there is provided a computer readable storage medium on which is stored an electronic money processing program comprising a transfer processing module for transferring a specified amount of money between two carriable cards from a general electronic money balance having an unlimited use range to a specific electronic money balance having a limited use range, the cards each incorporating an integrated circuit including a processor and a memory, the cards each storing therein the general electronic money balance, the specific electronic money balance and available genre information defining a use range of the specific electronic money balance; and a settlement processing module for comparing genre information acquired from a purchased commodity with the available genre information of the card, the settlement processing unit when a coincidence occurs deducting the purchased amount of money from the specific electronic money balance of the card, the settlement processing unit when a non-coincidence occurs prohibiting the deduction from the specific electronic money balance.

According to the present invention there is provided another electronic money apparatus comprising a carriable card incorporating an integrated circuit including a processor and a memory, the memory storing therein a specific electronic money balance having a limited use range, and available genre information defining a use range of the specific electronic money balance; and a settlement processing unit for comparing genre information acquired from a purchased commodity or a provided service with the available genre information of the card, the settlement processing unit when a coincidence occurs deducting the purchased amount of money from the specific electronic money balance of the card, the settlement processing unit when a non-coincidence occurs prohibiting the deduction from the specific electronic money balance. This electronic money apparatus enables electronic money having a limited use object to be transferred from a bank account directly to a card.

According to the present invention there is provided another electronic money processing method comprising a storage step for storing specific electronic money balance having a limited use range and available genre information defining a use range of the specific money balance, into a carriable card incorporating an integrated circuit including a processor and a memory; and a settlement step for comparing genre information acquired from a purchased commodity with the available genre information of the card and, when a coincidence occurs, deducting a purchase amount of money from the specific electronic money balance of the card and, when a non-coincidence occurs, prohibiting a deduction from the specific electronic money balance.

According to the present invention there is further provided a carriable card incorporating an integrated circuit including a processor and a memory, the memory storing therein a specific electronic money balance having a limited use range.

The above and other objects, aspects, features and advantages of the present invention will become more apparent from the following detailed description with reference to the accompanying drawings.

BRIEF DESCRIPTION OF THE DRAWINGS

FIG. 2 is a block diagram of a POS system for use in the present invention for the settlement by an IC card of the electronic money with the use object specified;

FIGS. 3A and 3B are explanatory diagrams of the IC card for use in the present invention;

FIG. 4 is a function block diagram of the IC card and the transfer apparatus of FIG. 1;

FIGS. 6A to 6D are explanatory diagrams of the details of available genre information of FIG. 5;

FIG. 7 is a flowchart of card-to-card transfer processing of FIG. 4;

FIG. 9 is an explanatory diagram of an item table stored in the POS server of FIG. 8;

FIG. 10 is an explanatory diagram of a price look-up table (PLU) stored in the POS server of FIG. 8;

FIG. 11 is an explanatory diagram of a POS management table stored in the POS server of FIG. 8;

FIG. 13 is an explanatory diagram of processing for returning the electronic money from a specific electronic money balance to a general electronic money balance between two cards, FIGS. 14A and 14B are flowcharts of the processing for the return between the two cards of FIG. 13;

DETAILED DESCRIPTION OF THE PREFERRED EMBODIMENTS

Figure 1:
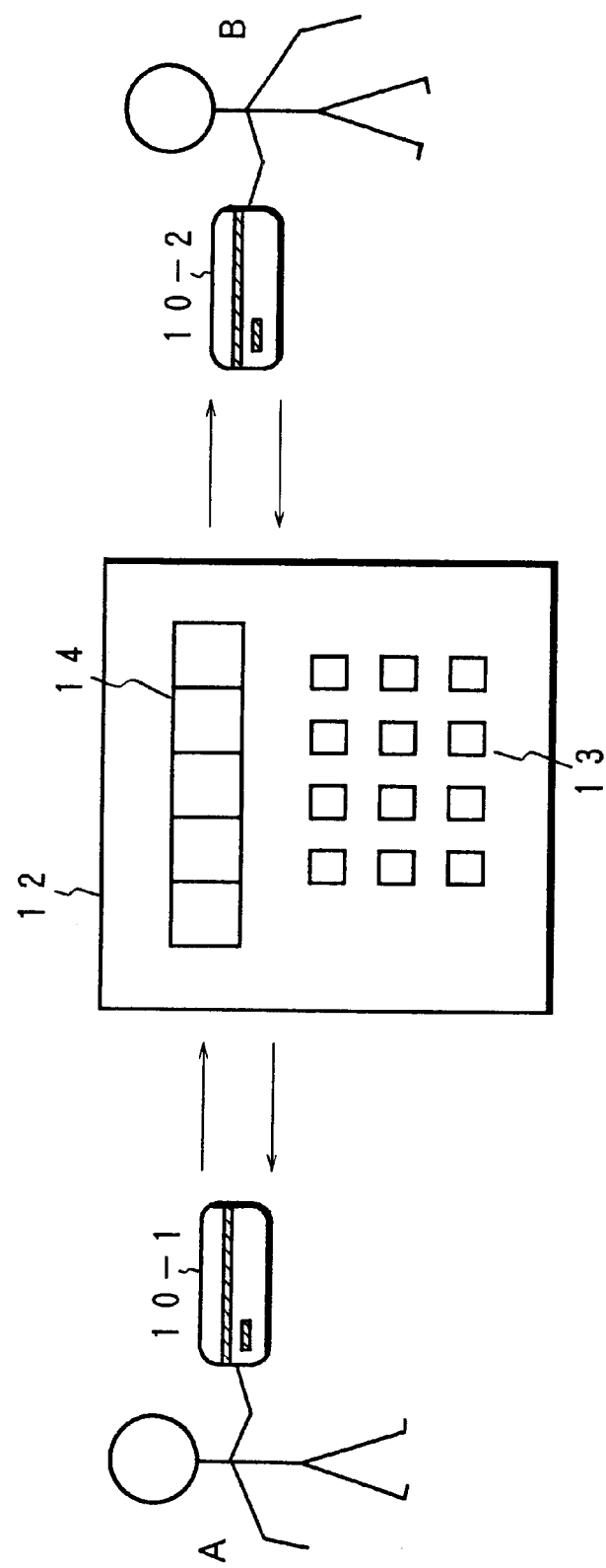
FIG. 1 is an explanatory diagram of a transfer apparatus for use in the present invention for a transfer of electronic money with its use object specified.

FIG. 1 illustrates an embodiment of an electronic money transfer apparatus for use in an electronic money apparatus in accordance with the present invention. The electronic money transfer apparatus is characterized in that it is in the form of a wallet provided in an electronic money system. The wallet acting as the transfer apparatus is designated at 12 and comprises a ten key 13 keypad, and a display unit 14. The wallet 12 allows a setting of two IC cards. Now, assume that A and B possess IC cards 10-1 and 10-2, respectively. For a transfer of the electronic money, the two IC cards 10-1 and 10-2 are set in the wallet 12 so that ordinary electronic money, namely, generic electronic money free from any restriction of use object can be transferred. In addition to this generic money transfer function, the present invention is characterized in that, when a transfer of electronic money is made from the transferor IC card 10-1 of A set in the wallet 12 to the transferee IC card 10-2 of B, the use object of the electronic money can be specified by A who is a possessor of the transferor IC card 10-1. This electronic money transferred from the transferor IC card 10-1 to the IC card 10-2 with a specification of the use object is referred to as specific electronic money of which use object is restricted. For this reason, when the IC card 10-2 accepts from A a transfer of electronic money of which use object is specified, i.e., specific electronic money, B is merely allowed to use the specific electronic money transferred to the IC card 10-2 for the settlement of purchase of a commodity or for the settlement of provision of a service which coincides with the use object specified by A, with inhibition of use of the transferred specific money for the settlement in case of different use object.

FIG. 2 is a block diagram of a POS system for executing a settlement of a purchased commodity by use of electronic money stored in an IC card 10. The POS system implements a function of a settlement processing unit in the electronic money apparatus of the present invention. The POS system comprises a host system 15, a host file unit 17, a POS server 16, a server file unit 18 and a pair of POS terminals 20-1 and 20-2. This embodiment is the case of a large-scale POS system by way of example although a medium-scale POS system is also available which comprises the POS server 16, the server file unit 18 and the POS terminals 20-1 and 20-2. In case of a small-scale POS system for private stores, it may be made up of only the POS terminals 20-1 and 20-2. Such POS systems are installed in department stores, convenience stores, private stores, etc., to execute electronic money settlement by use of the IC card 10 attendant on the purchase of a commodity or the provision of a service and to add up the results. In case of the electronic money apparatus of the present invention, when the IC card 10-2 accepts a transfer of the specific electronic money having a specified use object from A of FIG. 1 to execute settlement of a purchased commodity by the POS system of FIG. 2, B or a customer 11 hands to a seller the IC card 10-2 in which there has been stored specific electronic money having a specified use object. The seller sets the card into the POS terminal 20-1 for the settlement of the purchased commodity. At that time, a comparison is made between the purchased commodity genre and the specific genre indicative of a use object stored in the IC card 10-2 so that specific electronic money settlement is executed when the two genres coincide with each other. In the event of non-coincidence between the purchased commodity genre and the specific genre of the IC card 10-2, any specific electronic money settlement is impossible to perform, allowing the IC card 10-2 to be returned to B due to the unfeasible settlement.

Figure 3B:
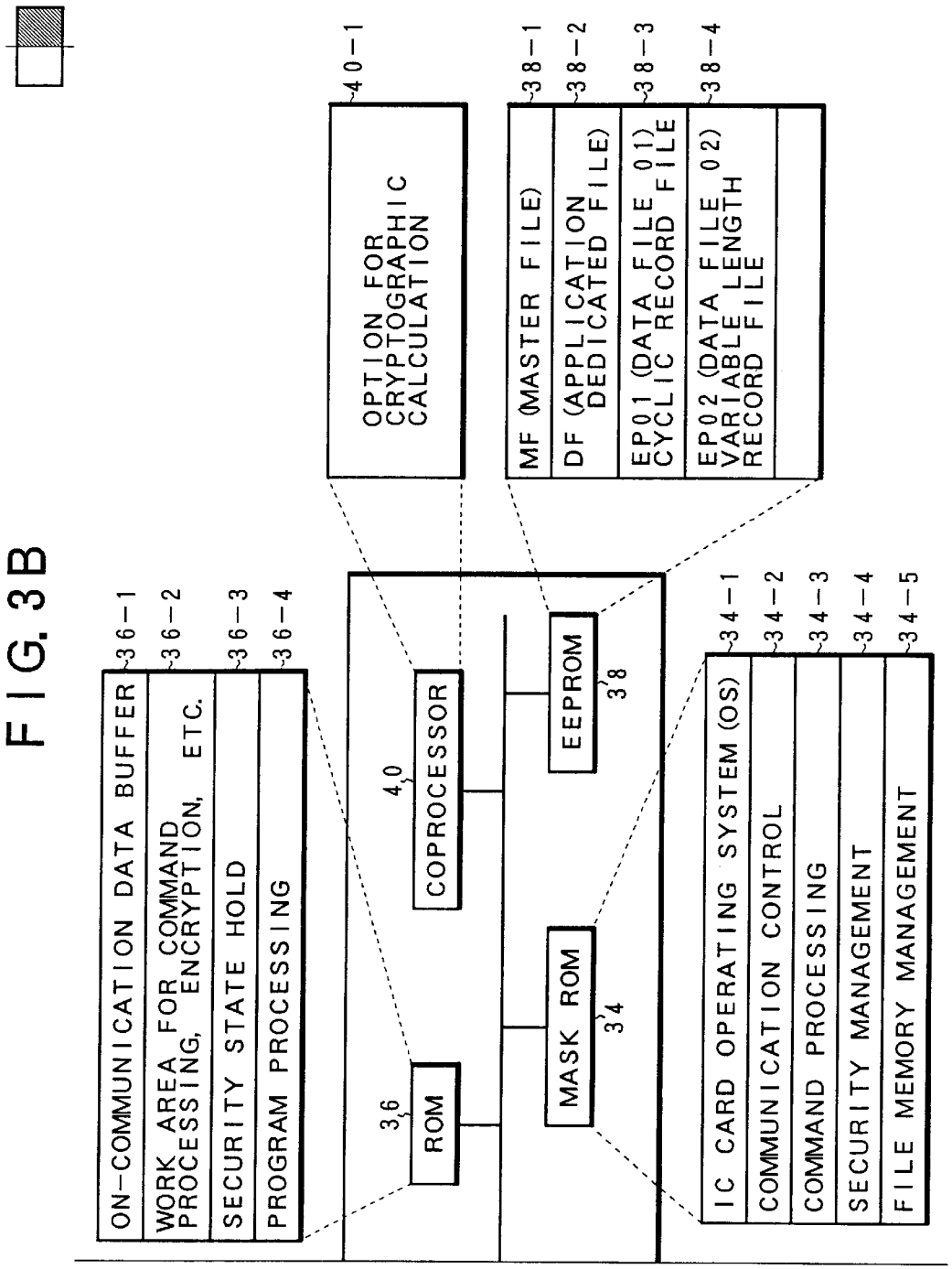

FIGS. 3A and 3B illustrate a structure and a function of the IC card 10 for use in the present invention. The IC card 10 carries thereon an IC module 22, which as shown in an enlarged section below the IC card 10 in FIG. 3A, comprises a terminal substrate 24 having an IC chip 26 located at the underside corners thereof, with bonding wires 28 connecting the terminal substrate 24 and the IC chip 26. Portions of the IC chip and the bonding wires 28 are sealed by a mold material such as a resin. As indicated by dotted lines in an enlarged and excluded manner in FIGS. 3A and 3B, the IC chip includes a microprocessor (MPU) 32, a mask ROM 34, a RAM 36, an EEPROM 38, a coprocessor 40 and an input/output port 42. The mask ROM 34 stores therein a program (OS) for the microprocessor 32 providing the control of all processing of the IC card 10. Data of the mask ROM are protected from being erased upon the power off and are inhibited from being rewritten. The mask ROM 34 is provided for example with an IC card operating system 34-1, a communication control module 34-2, a command processing module 34-3, a security management module 34-4 and a file memory management module 34-5. The RAM 36 is a work memory for use in, e.g., a data buffer work area and permits the storage data to be erased upon the power off. The RAM 36 includes for example an on-communication data buffer 36-1, a work area 36-2 for command processing, encryption, etc., a security state hold area 36-3 and a program processing area 36-4. The non-volatile EEPROM 38 stores data at a position defined in accordance with the IC card operating system 34-1 of the mask ROM 34. In this case, a file creation command lying within the IC card operating system 34-1 allows a free allocation of files and securities in conformity with the application use object. Naturally, the data are not erased even when the power supply has been cut off. The data rewriting is feasible under the management of the security management module 34-4. More specifically, the EEPROM 38 holds a master file 38-1, an application dedicated file 38-2, an EF01 cyclic record file 38-3, and an EF02 variable length record file 38-4. The coprocessor 40 is utilized as an option 40-1 for cryptographic calculation. The input/output port 42 includes a power source port 42-1, a power source signal port 42-2, a reset port 42-3, a clock port 42-4 and a communication input/output port 42-5. Such an IC card 10 conforms to industry standards such as EMV specifications for example and accepts abundant related goods such as an IC card reader/writer, a value service terminal, a balance reader and a smart access. Use can be made for example of a "smart card vision" supplied as an IC card resolution by Fujitsu Ltd. Naturally, this is not limited, allowing use of other electronic money systems utilizing an appropriate IC card.

FIG. 4 is a function block diagram showing the function of the transfer apparatus for use in the electronic money apparatus of the present invention of FIG. 1, as well as the transferor IC card 10-1 and the transferee IC card 10-2. The transferor IC card 10-1 and the transferee IC card 10-2 store on a memory, more specifically, on the EEPROM 38 of FIGS. 3A and 3B, bank account information 44-1 and 44-2, general electronic money balances 46-1 and 46-2, use limit information (specific genre information) 48-1 and 48-2 and specific electronic money balances 50-1 and 50-2. The wallet 12 acting as the transfer apparatus comprises a transfer processing unit 52 and a return processing unit 54. The transfer processing unit 52 allows a free transfer of a specified amount from the general electronic money balance 46-1 of the transferor IC card 10-1 to the general electronic money balance 46-2 of the transferee IC card 10-2. With a specification of the use object, the transfer processing unit 52 allows a transfer of a specified amount from the general electronic money balance 46-1 of the transferor IC card 10-1 to the specific electronic money balance 50-2 of the transferee IC card 10-2. In response to the transfer of the electronic money to the specific electronic money balance 50-2 with the specification of the use object, specific genre information for specifying the use object specified upon the transfer is written to the use limit information 48-2 of the transferee IC card 10-2. The return processing unit 54 of the wallet 12 performs return processing for returning, the electronic money transferred with the specification of the use object, from the specific electronic money balance 50-2 of the, transferee IC card 10-2 to the general electronic money balance 46-1 of the transferor IC card 10-1. This processing of return from the specific electronic money balance 50-2 includes not merely the return to the transferor IC card 10-1 but also a return to a specific electronic money balance of the other IC card and a return to the general electronic money balance 46-2 on the same IC card 10-2. It is to be noted that a return to the specific electronic money balance of IC cards other than the transferor IC card needs a permission of the possessor of the transferor IC card 10-1.

Figure 5:
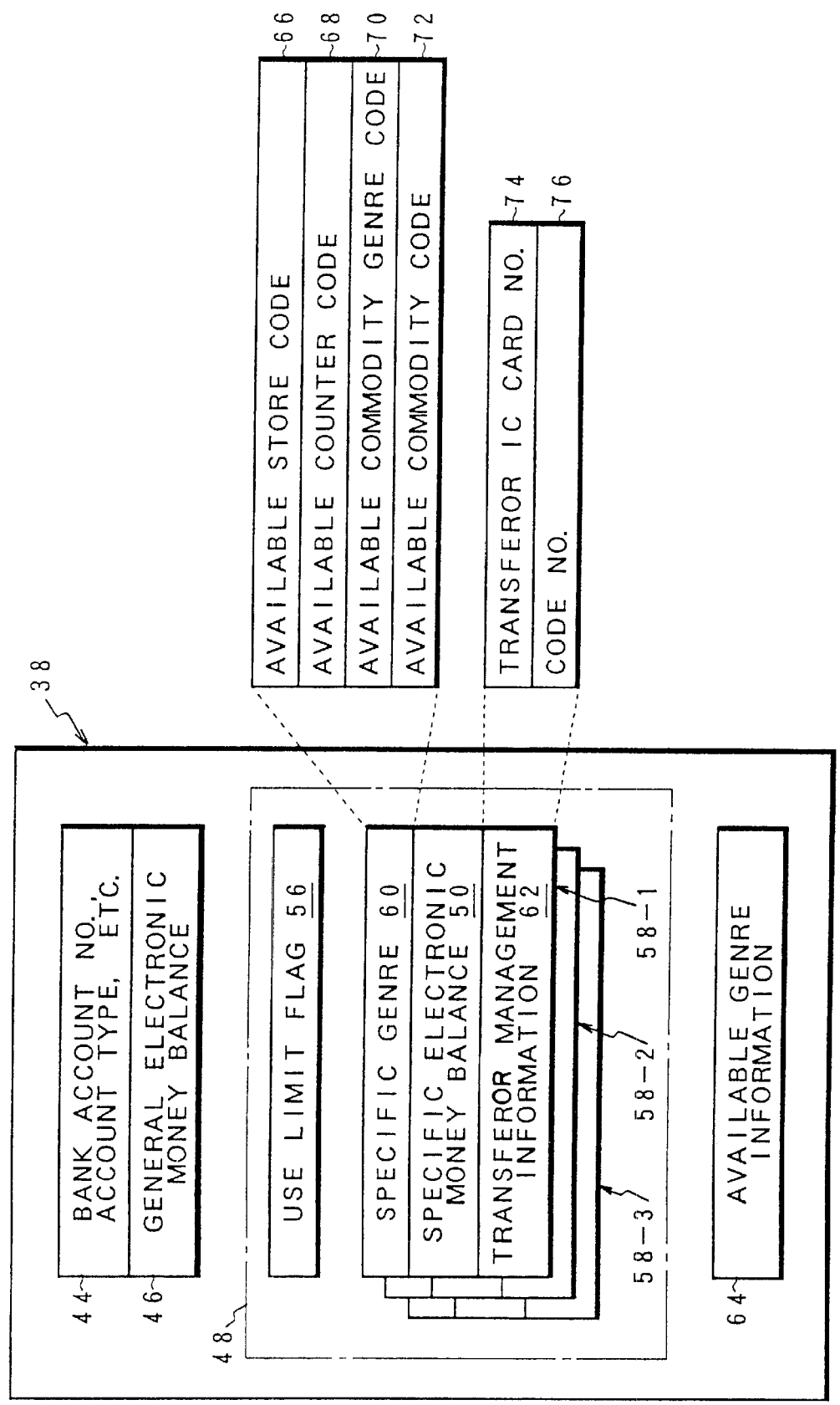
FIG. 5 is an explanatory diagram of electronic money related information stored in the IC card of FIG. 4.

FIG. 5 illustrates in an exclusive manner the details of the electronic money related information stored in the transferor IC card 10-1 and the transferee IC card 10-2 of FIG. 4. The EEPROM 38 holding the electronic money related information stores therein the bank account information 44 in the form of bank account Nos., account types, etc. Stored as the use limit information 48 are a use limit flag 56 and a specific genre 60. The use limit flag 56 has a flag value indicative of whether the specific electronic money balance 50 is limited. For example, the flag=0 represents unlimited, and the flag=1 represents limited. The limited flag may have a different flag value in combination with the specific genre 60. For example, the flag value=1 may represent available in a specified member store, the flag value=2 may represent available in a specific genre, e.g., a book counter of a specified member store, and the flag value=3 may represent available for a specified commodity, e.g., a reference book of a specified member store. Note that the following description is made of a case for example where the use limit flag 56 has the flag value 0 for unlimited and the flag value 1 for limited. The specific genre 60 is combined with transferred specific electronic money balance 50 and transferor management information 62. Transferred electronic money information 58-1 is created for each specific electronic money transfer and is made up of the specific genre 60, the specific electronic money balance 50 and the transferor management information 62. This example includes three transferred electronic money information 58-1, 58-2 and 58-3. The specific genre 60 consists, as shown in an excluded manner on the right-hand side, of e.g., an available store code 66, an available counter code 68, an available commodity genre code 70 and an available commodity code 72. A storage is made by specifying at least one code upon a transfer of the specific electronic money. The transferor management information 62 is information indicative of a transferor of the specific electronic money balance 50 and includes, as shown in an excluded manner on the right-hand side of FIG. 5, a transferor IC card number 74 and a code number 76. The transferor IC card number 74 and the code number 76 are used in the return processing for inter-card or intra-card of electronic money from the specific electronic money balance 50 to the general electronic money balance 46. The EEPROM 38 further stores available genre information 64 therein. The available genre information 64 is used for setting use limit information upon a transfer of the specific electronic money to the other IC card through the specification of a use object. The available genre information 64 includes table information shown in FIGS. 6A to 6D for example.

FIG. 6A illustrates an available store table 64-1 in which are stored available store names and available store codes. When the available store name, e.g., "store B member" is specified as the information for specifying the use object for instance in a state where the transferor IC card 10-1 and the transferee IC card 10-2 are set in the wallet 12 as shown in FIG. 1, reference is made to the available store table 64-1 of FIG. 6A to read a corresponding available store code "0002", which in turn is transferred to the transferee IC card 10-2 and is registered as the available store code 66 in the specific genre 60 on the EEPROM 38 of FIG. 5. FIG. 6B illustrates an available counter table 64-2 in which are registered available counter names and available counter codes. FIG. 6C illustrates an available commodity genre table 64-3 in which are registered available commodity genre names and their respective genre codes. FIG. 6D illustrates an available commodity table 64-4 in which are registered available commodity names and their respective commodity codes. Naturally, the specific genre information designated for specifying a use object upon a transfer to the specific electronic money balance is not limited to that illustrated in FIGS. 6A to 6D and can include, as needed, time zone, day-of-the-week, period-of-time, and use objects such as transportation expenses, entertainment expenses, school expenses, school lunch expenses, school excursion expenses, etc.

FIG. 7 is a flowchart of a card-to-card electronic money transfer processing using the wallet 12 as the transfer apparatus of FIG. 4. First in step S1, the transferor IC card 10-1 and the transferee IC card 10-2 are set in the wallet 12. Then in step S2, the possessor of the transferor IC card 10-1 uses the wallet 12 to designate a transferred amount and a specific genre for specifying the use object. Then in step S3, the transfer processing unit 52 acquires the card number and the code number of the transferor IC card 10-1. Then in step S4, the transfer processing unit 52 executes the register processing for the transferee card 10-2. This register processing includes turning on to 1 the flag value of the use limit flag contained in the use limit information of the transferee IC card 10-2; registering the specified genre code designated in step S2 to a specific genre within the use limit information 48-2; and adding the designated transferred amount to the specific electronic money balance 50-2. Then the transferor card number and the code number acquired in step S3 are registered in the transferor management information 62 contained in the use limit information 48-2. After the completion of this transfer registration processing, the card is ejected for return in step S5 to complete a series of transfer processes.

Figure 8:
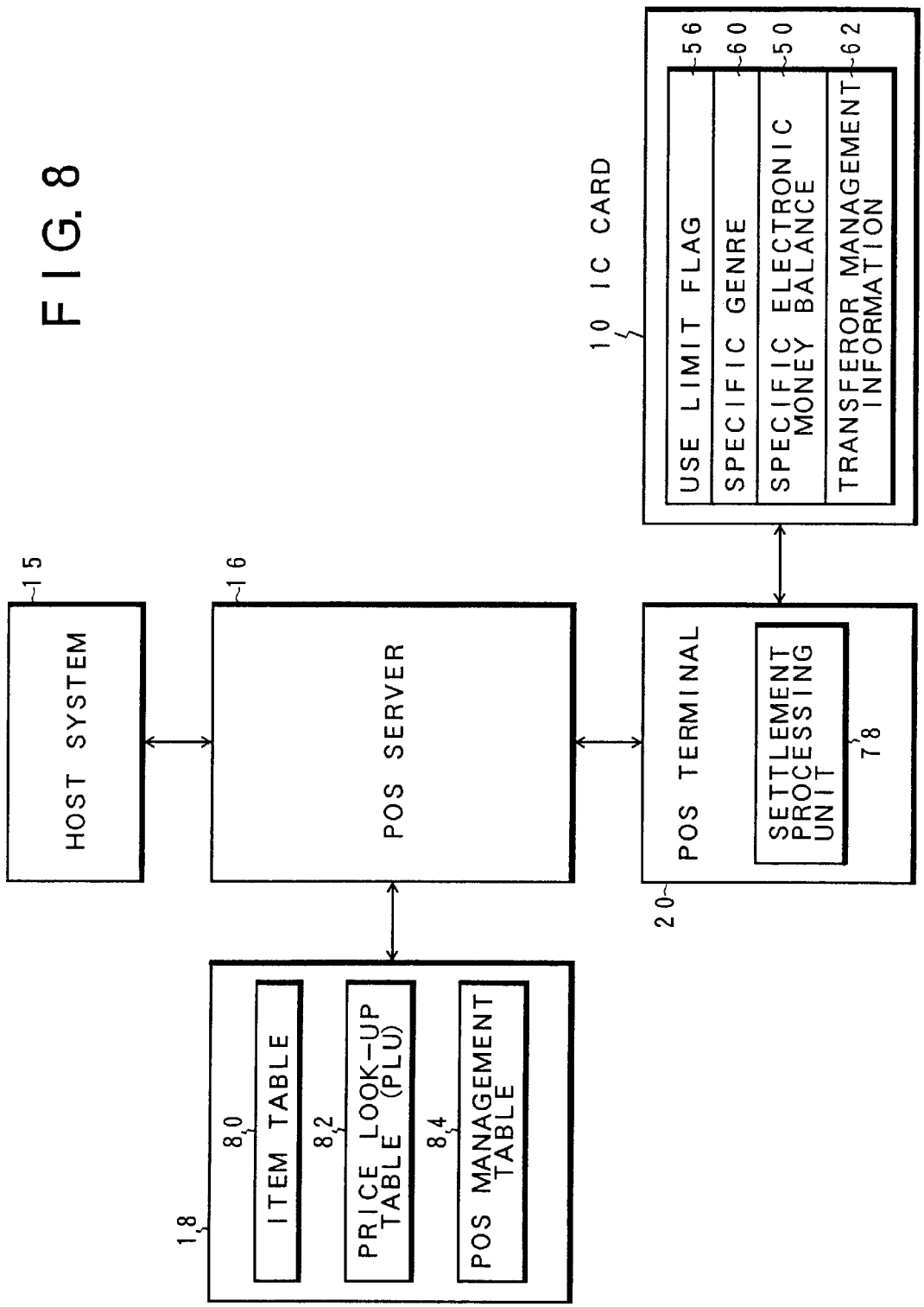
FIG. 8 is a function block diagram of settlement processing effected by the POS system of FIG. 2.

FIG. 8 is a function block diagram of the settlement processing function implemented by the POS system of FIG. 2, by use of the IC card which has received a transfer of the specific electronic money having a specified use object. The POS terminal 20 is provided with a settlement processing unit 78 which allows a settlement of the specific electronic money balance 50 of the IC card 10 having the specified use object. When the IC card 10 is set in the POS terminal 20 for the settlement of a purchased commodity, the settlement processing unit 78 refers, on the basis of the purchased commodity, to an item table 80, a price look-up table 82 or a POS management table 84 which is stored in the server file apparatus 18 of the POS server 16 to recognize the genre of the purchased commodity. After the recognition of the genre of the purchased commodity, the settlement processing unit 78 refers to the use limit flag 56 of the IC card 10 and, if the flag value of the use limit flag is equal to 1 indicative of limited, reads a specific genre 60 to compare it with the genre of the purchased commodity acquired from the POS server 16. If the purchased commodity genre is coincident with the specific genre of the IC card 10, then the purchase amount is settled from the specific electronic money balance of the IC card 10. If the purchased commodity genre is not coincident with the specific genre 60 of the IC card 10, then the settlement processing unit 78 ejects the IC card 10 without performing the settlement of the amount of the purchased commodity.

FIG. 9 illustrates the item table 80 stored in the server file apparatus of FIG. 8 and having an item code 86 and an item 88. In addition to these, the item table 80 of the present invention further has a classification 90. For example, an item "shirt" corresponding to an item code "101" has a classification code "2". The classification code "2" corresponds for example to "light clothing" of the commodity genre. The other classifications include for example "foods", "heavy clothing", "miscellaneous goods", "household appliances" and "furniture" which are given proper classification codes. The item code 86 of the item table 80 is usable intactly as the available commodity code in the specific genre information.

FIG. 10 is an explanatory diagram of the price look-up table 82 stored in the server file apparatus 18 of FIG. 8. The price look-up table 82 is ordinarily one known per se. The price look-up table 82 has a PLU code 92 and a price 94, as well as classification code 90 newly provided in case of the present invention. This classification code 90 is the same as that used in the item table 80 of FIG. 9.

FIG. 11 is an explanatory diagram of the POS management table 84 stored in the server file apparatus 18 of FIG. 8. The POS management table 84 stores therein a POS number 96 indicative of a POS terminal placement table or a placement location, a member code 98 of the POS terminal, and a counter code 100. Reference is made to this POS management table 84 for the comparison and collation with the available store code or the available counter code acquired as the specific genre information on the IC card 10 side.

Figure 12:
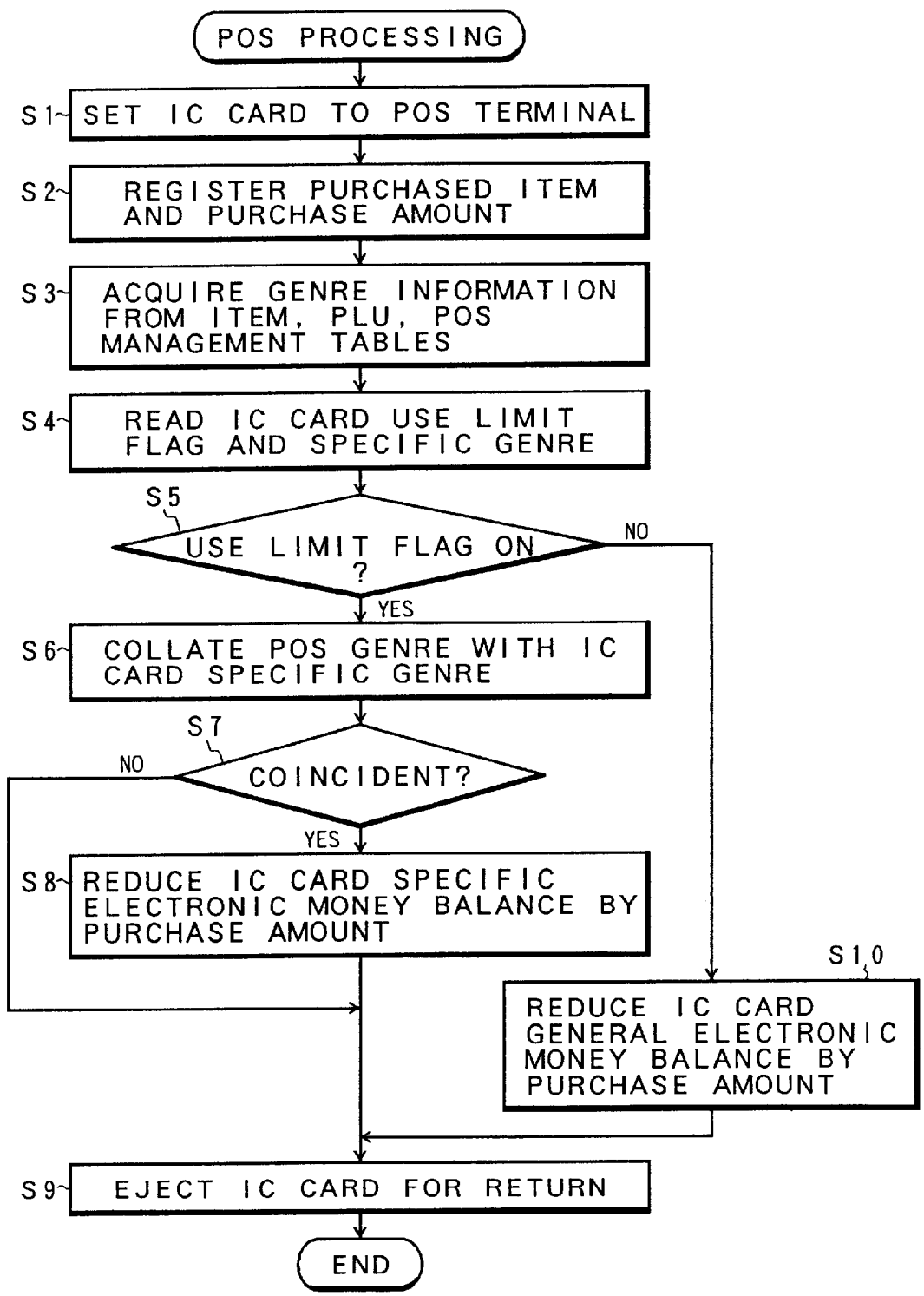
FIG. 12 is a flowchart of the settlement processing effected by the POS system of FIG. 8.

FIG. 12 is a flowchart of the POS processing including the settlement processing of the settlement processing unit 78 provided in the POS terminal 20 of FIG. 6. First in step S1, a seller accepts a purchased commodity as well as the IC card 10 of the customer and sets the card in the POS terminal 20. Then in step S2, the purchased commodity and the purchase amount are entered for registration by means of the bar code reader or the ten key keypad of the POS terminal 20. Then in step S3, the POS terminal 20 makes access to the POS server 16 to refer to the price look-up table 82 or the POS management table 84 to acquire the purchased commodity genre. Then in step S4, the IC card use limit flag and the specific genre are read, and in step S5, a check is made to see if the use limit flag is on or not. If the use limit flag is on, then in step S6 the genre acquired on the POS side is compared and collated with the specific genre read from the IC card 10. If in step S7 a coincidence of collation is achieved as a result of the comparison and the collation of the genres, then in step S8 the settlement processing is performed in which the purchase amount is deducted from the specific electronic money balance 50 of the IC card. On the contrary, if the genre collation results in non-coincidence, then the settlement processing of the specific electronic money balance of step S8 is not performed and in step S9 the IC card 10 is ejected for return. If the use limit flag read from the IC card in step S5 is off, then in step S10 ordinary electronic money settlement processing is performed in which the purchase amount is deducted from the general electronic money balance of the IC card, and in step S9 the IC card is ejected for return.

FIG. 13 is an explanatory diagram of the return processing for returning the electronic money from the specific electronic money balance to the general electronic money balance between two different IC cards. Using the wallet 12, B attempts to return the electronic money from the specific electronic money balance having a specified use object of the IC card 10-2 to the general electronic money balance of an IC card 10-3 possessed by C. In this case, the wallet 12 executes the return processing by the return processing unit 54 shown in the function block diagram of FIG. 4. First set in the wallet 12 are the returning IC card 10-2 of B and the returned IC card 10-3 of C. When B enters a return amount of money by use of the ten key keypad 13 of the wallet 12 in this state, the wallet 12 recognizes the card number and the code number of the transferor IC card 10-1 from the transferor management information read from the returning IC card 10-2 and requests a permission of transferor A. Then, the transferor A enters a code number through the setting of the IC card 10-1 into the wallet 12 or by means of the ten key keypad 13, in response to which the wallet 12 makes a comparison and collation with the transferor code number acquired from the returning IC card 10-2 and, if the collation results in a coincidence, judges that the permission of the transferor has been obtained. Then the wallet 12 withdraws the designated return amount of money from the specific electronic money balance of the IC card 10-2 and adds it to the general electronic money balance of the returned IC card 10-3.

On the contrary, in case the electronic money is returned from B's IC card 10-2 which is the transferee of the specific electronic money to the A's IC card 10-1 which is the transferor, the returning IC card 10-2 and the returned IC card 10-1 are set in the wallet 12 to designate a return amount of money, with the result that the returning card number acquired from the returning IC card 10-2 coincides with the returned card number acquired from the returned IC card 10-1, whereby the returned subject is judged to be the transferor. In this event, the designated return amount of money is withdrawn intactly from the specific electronic money balance without needing any permission of the transferor A, and is added to the general electronic money balance of the IC card 10-1.

FIGS. 14A and 14B are flowcharts of return processing from the specific electronic money balance to the general electronic money balance between the two cards of FIG. 13. First in step S1, the returning IC card and the returned IC card are set in the wallet 12 and in step S2, a return amount of money is designated. After the designation of this return amount of money, the transferor card number is acquired from the transferor management information of the returning IC card in step S3. It is judged in step S4 whether the returned card number acquired from the returned IC card is coincident with the transferor card number acquired in step S3, and if coincidence is achieved, a return to the transferor is judged, allowing the procedure to advance to step S5 in which the designated return money is deducted from the specific electronic money balance of the returning IC card and the return amount of money is added to the general electronic money balance of the returned IC card. Then in step S10, the card is ejected for return to complete a series of processes. On the contrary, if the returned card number is not coincident with the transferor card number in step S4, then a permission for transfer is requested of the possessor of the transferor IC card in step S6. More specifically, a request is made of the code number of the transferor IC card. This code number input response may be made through the ten key keypad 13 of the wallet 12 of FIG. 13 by setting the transferor IC card 10-1 in the wallet 12. If in step S7 the code number of the transferor IC card is coincident with the code number acquired from the returning IC card transfer management information, then it is judged that a permission for transfer has been made, allowing the return amount of money from being deducted from the specific electronic money balance of the returning IC card in step S8. Then in step S9, registration processing to the returned IC card is carried out. This registration processing includes turning on the use limit flag of the returned IC card, registering into the specific genre a designated code acquired from the returning card, and adding the return amount of money to the specific electronic money balance. Furthermore, the transferor card number and the code number are registered in the transferor management information of the returned IC card. This allows the electronic money from the specific electronic money balance of the returning IC card to be returned to the IC card other than the transferor IC together with the use limit information.

Figure 15:
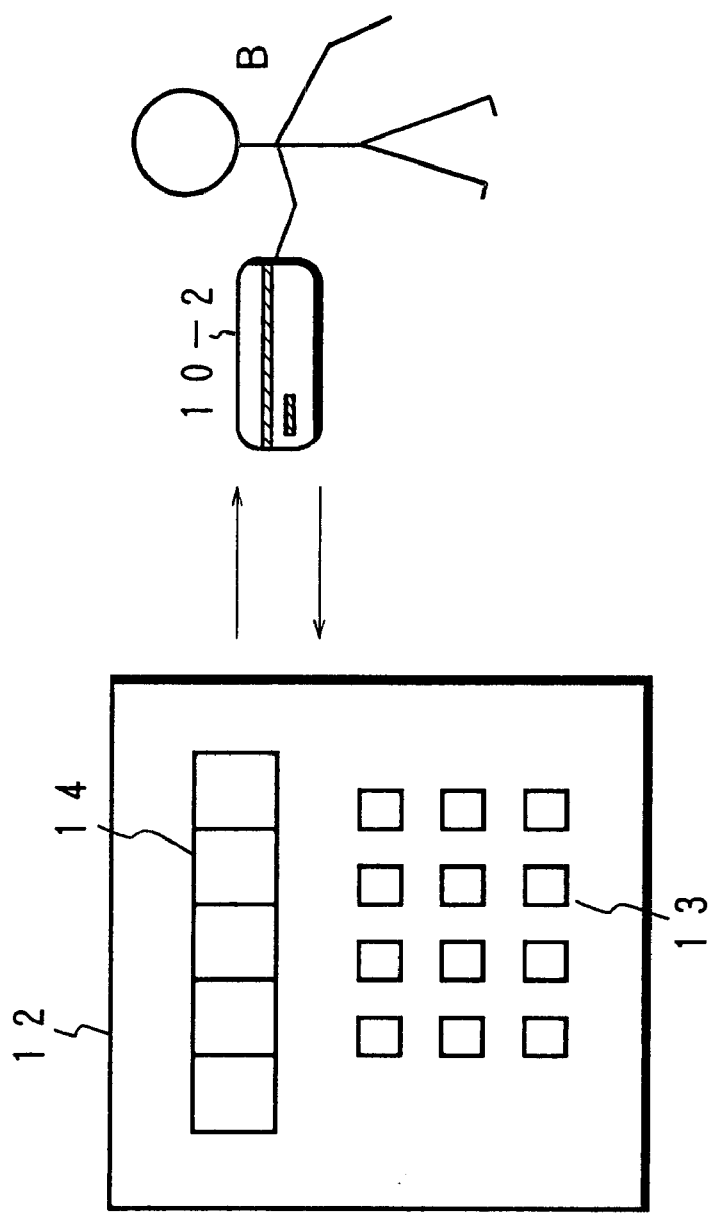
FIG. 15 is an explanatory diagram of processing for returning the electronic money from the specific electronic money balance to the general electronic money balance on the same card.

FIG. 15 is an explanatory diagram of a return of the electronic money from the specific electronic money balance to the general electronic money balance on the same IC card. B attempts to return the electronic money from the specific electronic money balance to the general electronic money balance on the IC card 10-2 possessed by B. To this end, the IC card 10-2 is set in the wallet 12 for return processing and a return amount of money is entered by means of the ten key keypad 13, in response to which the wallet 12 requests a permission of A who is the possessor of the transferor IC card. Then, B orally acquires the code number from A, or A enters directly the code number through the ten key keypad 13, or the transferor IC card is set in the wallet 12, so that a permission of the transferor is acquired to allow the designated amount of money to be transferred from the specific electronic money balance of the IC card 10-2 to the general electronic money balance.

Figure 16:
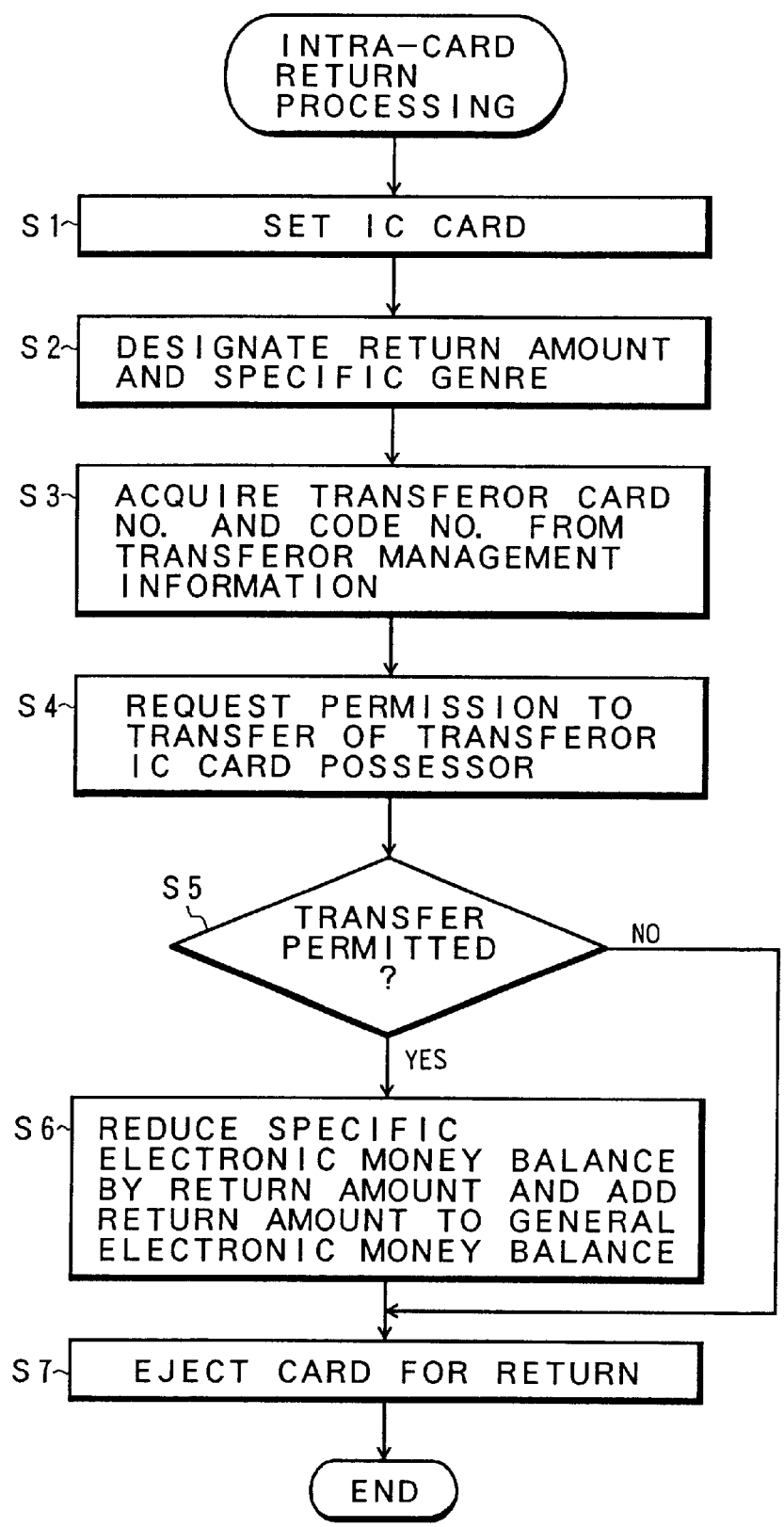
FIG. 16 is a flowchart of the processing for the return on the same card of FIG. 15.

FIG. 16 is a flowchart of the return processing on the same IC card of FIG. 15. First in step S1, the IC card is set in the wallet 12 and in step S2, designation is made of the return amount of money and the specific genre. Since in this case the transfer electronic money information is registered for each transfer of the specific electronic money balance 46 as the transfer electronic money information 58-1 to 58-3 of FIG. 5, designation of a specific genre allows any one of the transfer electronic money information 58-1 to 58-3 for example to be specified. Then in step S3, the transferor card number and the code number are acquired from the transferor management information and in step S4, a permission for the transfer is requested of the possessor of the transferor IC card. The code number of the transferor IC card is entered for this transfer permission request, so that when the entered code number is coincident with the code number acquired in step S3, it is judged in step S5 that a permission for transfer has been made. Then in step S6, the designated return amount of money is deducted from the specific electronic money balance and is added to the general electronic money balance to thereby cancel the specification of the use object and in step S7, the card is ejected for return. The code number for use in the card-to-card return processing of FIG. 14 or the intra-card return processing of FIG. 16 can be either I. fixed type, or II. variable type The fixed type code number allows at all times the registration of the same code number upon a transfer of the electronic money with the specified use object from the general electronic money balance of the IC card 10-1 to the specific electronic money balance of the IC card 10-2 as shown in FIG. 1. In contrast with this, the variable type code number allows a different code number to be registered for each transfer of the electronic money with the specified use object from the IC card 10-1 to the IC card 10-2 as shown in FIG. 1. Thus, in case of the fixed type code number, when the code number 76 registered in each transferor management information 62 of the transfer electronic money information 58-1 to 58-3 of FIG. 5 is the variable type code number, different values are given so that even though the possessor of the IC card having the specific electronic money balance stored therein with the specified use limit knows the code number the possessor cannot freely use the acquired code number for the transfer to the general electronic money balance without obtaining permission for the transferor since the different code number is used for each transfer electronic money information, thereby achieving a higher security.

Figure 17:
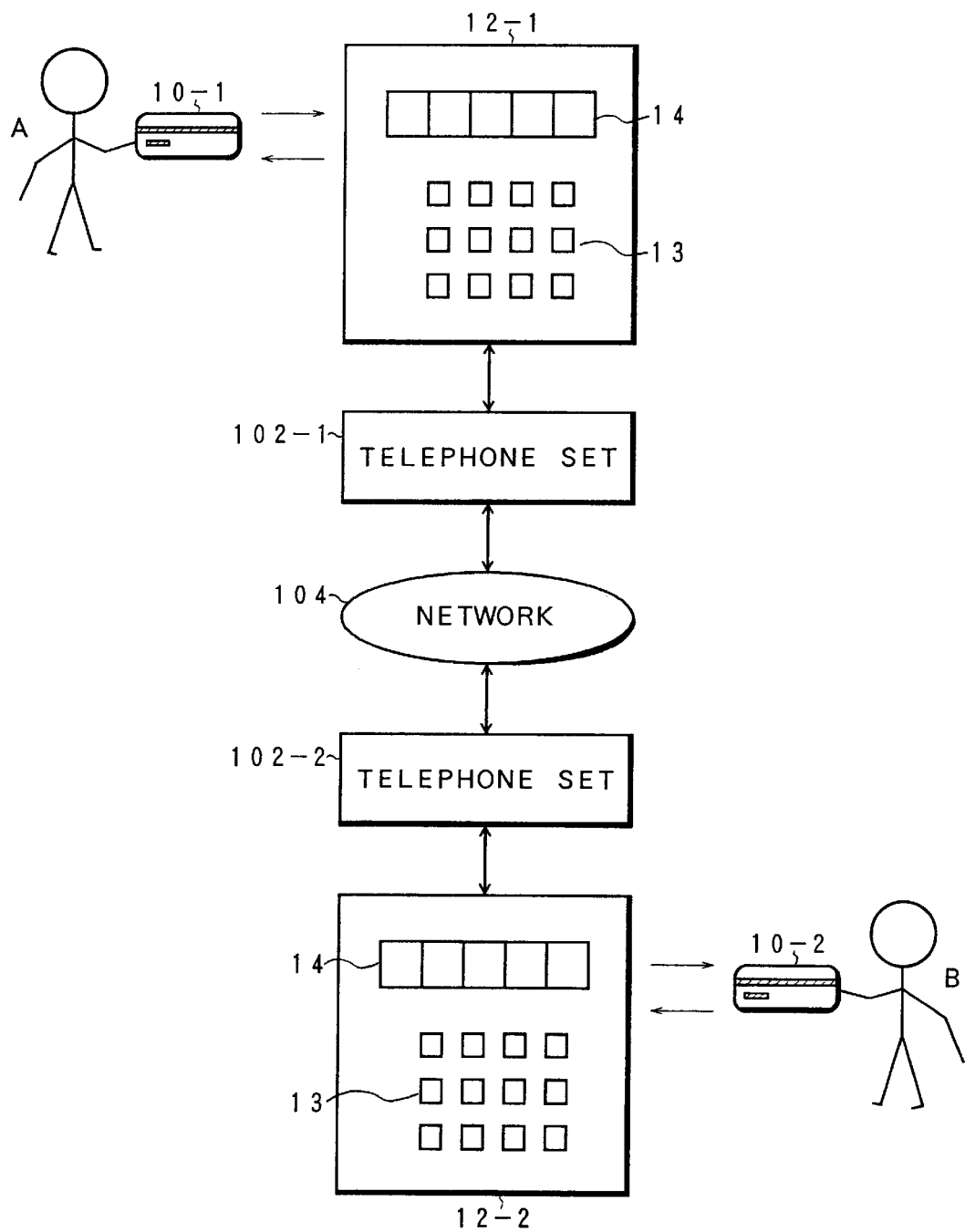
FIG. 17 is an explanatory diagram of another embodiment of the transfer apparatus of the present invention for the transfer of the electronic money with its use object specified between two cards by way of a network.

FIG. 17 illustrates another embodiment of the transfer processing effected by the electronic money apparatus of the present invention, in which a transfer of electronic money is feasible between two cards remote from each other by way of a communication network. Wallets 12-1 and 12-2 carried by the possessors of the IC cards 10-1 and 10-2, respectively, can be connected to each other by-way of a network 104 through the connection to respective telephone sets 102-1 and 102-2. In such a state where a communication line is established by the network 104 using the telephone sets 102-1 and 102-2, for example A sets the IC card 10-1 in the wallet 12-1 and B sets the IC card 10-2 in the wallet 12-2 so that the transfer of the electronic money from the IC card 10-1 to the IC card 10-2 with the specified use object can be carried out in the same manner as the case of FIG. 1. This transfer of the electronic money is applicable both to the return from the specific electronic money balance to the general electronic money balance between two different IC cards of FIG. 13 and to the return from the specific electronic money balance to the general electronic money balance on the same IC card of FIG. 15. In case of the return on the same IC card of FIG. 15, B who is the possessor of the IC card 10-2 requests a permission of A who is the possessor of the returning IC card 10-1 by way of the network 104. In case for example A is a parent of B who is a college student or the like at a remote place, in particular, the transfer of the electronic money using the network of FIG. 17 allows the parent A to easily transfer the electronic money to the child B with the use object specified to tuition fees, rent, living expenses, etc., so that the student B who has received the transfer of the electronic money can make appropriate use of the electronic money by the IC card 10-2 in conformity to the specified use object.

The present invention further provides a computer readable record medium on which is recorded an electronic money processing program having a function of FIGS. 1 to 17. This record medium can be for example a removable hand-held storage medium such as a CD-RAM or a floppy disk, a storage apparatus for a program provider who provides a program by way of lines, and a memory device such as a RAM or a hard disk of a program installed processor. The program provided by the storage medium is loaded into the processor and is run on its main memory.

Another embodiment of the present invention may be provided in such a manner that the EEPROM 38 of the IC card 10 of FIG. 4 includes only the specific electronic money balance 50 with the exclusion of the general electronic money balance 46 so that the electronic money can directly be transferred from the bank account to the specific electronic money balance 50 of the IC card 10 so as to allow the electronic money to be used with the specified use object. The IC card 10 having only the specific electronic money balance 50 also enables the electronic money to be transferred from the specific electronic money balance 50 by use of the wallet 12 as shown in FIG. 3. Provision of such an IC card dedicated to the specific electronic money balance allows the parent to give the child an IC card in which expenses to be paid to the school or the like are included in the specific electronic money balance, thereby ensuring a safe payment of expenses by the child utilizing the IC card under the management of the parent.

According to the present invention as described hereinabove, the electronic money can be transferred with the use object specified upon the transfer of the electronic money between two IC cards, so that when for example the parent transfers the electronic money to the IC card of the child, a required amount of money can be transferred with the use object specified to, e.g., "books" or "reference books", thereby making it possible to prevent a use departing from the transfer object.

Although the transfer apparatus of the above embodiment has been in the form of the wallet by way of example, it is natural that use may be made of a processor such as a personal computer in which is installed as an application a transfer processing program having processing functions of the transfer processing unit 52 and the return processing unit 54 shown in the wallet 12 of FIG. 4. It is also appreciated that the present invention is not limited to the above embodiments and includes appropriate variants insofar that the objects and advantages thereof are not impaired. The present invention is not intended to be restricted by the numerical values shown in the above embodiments. It is also possible to transfer the electronic money having a specified use object to another IC card with the use object specified or to return the same to the returning card with the use object specified, whereby the value of utilization of the electronic money system using the IC card is enhanced, providing effective measures against the incorrect use or for the prevention of offense as well as a wider spread of use.

What is claimed is:

1. An electronic money apparatus, comprising:

a carriable card having an integrated circuit with a processor and a memory, the memory storing therein a general electronic money balance available for any genre purchase, a specific electronic money balance available for specific genre purchases, and available genre information defining the types of purchases for which the specific electronic money balance may be used, the available genre information stored in said card containing a use limit flag defining the presence or absence of a use limit, and specific genre information containing at least one of an available store, an available counter, an available commodity genre and an available commodity;

a transfer processing unit in which a transferor carriable card and a transferee carriable card are placed, the transfer processing unit receiving an amount of money to transfer and a genre code specifying a use restriction of the money to be transferred, acquiring a card number and a password of the transferor card and the transferee card, respectively, setting the use limit flag of the transferee card, registering the genre code in the transferee card, withdrawing the specified amount of money to be transferred from the general electronic money balance of the transferor card and adding the same to the specific electronic money balance of the transferee card, and registering the card number and the password of the transferor card in the transferee card, the transfer processing unit comprising one of a handheld computing device and a personal computer; and a settlement processing unit comparing genre information acquired from a purchased commodity or a provided service with the available genre information of the transferee carriable card, said settlement processing unit, when a coincidence occurs, deducting the purchased amount of money from the specific electronic money balance of the transferee carriable card, said settlement processing unit, when a non-coincidence occurs, prohibiting the deduction from the specific electronic money balance.

2. An electronic money apparatus according to claim 1, wherein:

said use limit flag has a flag value indicative of the absence of a limit or a flag value indicative of the presence of a limit, and said flag value indicative of the presence of a limit comprises a plurality of flag values set in accordance with different contents of the limit.

3. An electronic money apparatus according to claim 1, wherein said card stores, in addition to the available genre information paired with the specified amount of money, transferor management information containing a card number and a code number of the transferor card.

4. An electronic money apparatus according to claim 1, wherein at every transfer from the general electronic money balance to the specific electronic money balance, said card registers the transferred specific electronic money balance and the available genre information.

5. An electronic money apparatus according to claim 1, wherein upon a transfer of a specified amount of money paired with a specified genre said transfer processing unit registers a card number and a code number of the transferor card into transferor management information of the transferee card, if, upon a return of a specified amount of money from the specific electronic money balance, a returned card is coincident with the transferor card through a reference to the transferor management information, then said transfer processing unit returns the specified amount of money intactly to the general electronic money balance of the transferor card, and if the returned card is not coincident with the transferor card, then said transfer processing unit judges that the returned card is a third card different from the transferor card and transfers the specified amount of money paired with one or more corresponding genres to a specified electronic money balance of the third card through the acquisition of a permission for transfer based on the coincidence of collation of an input code number of the transferor card with a code number of the transferor management information.

6. An electronic money apparatus according to claim 5, wherein
upon a transfer of a specified amount of money, said transfer processing unit uses a fixed value as the code number registered in the transferor management information of the transferee card.

7. An electronic money apparatus according to claim 5, wherein
upon a transfer of a specified amount of money, said transfer processing unit varies with each transfer the code number registered in the transferor management information of the transferee card.

8. An electronic money apparatus according to claim 1, wherein
said transfer processing unit returns a specified amount of money from the specific electronic money balance of one card to the general electronic money balance of the same card.

9. An electronic money apparatus according to claim 1, wherein:
at every transfer of a specified amount of money paired with a specified genre from a general electronic money balance of the transferor card to a specific electronic money balance of the transferee card, said transfer processing unit registers a card number and a code number of the transferor card into transferor management information of the transferee card, and through the acquisition of a permission for transfer based on a coincidence of collation of the code number of the transferor card with a code number of the transferor management information of the transferee card, said transfer processing unit returns the specified amount of money from the specific electronic money balance of the transferee card to the general electronic money balance of the same transferee card.

10. An electronic money apparatus according to claim 1, wherein:
said settlement processing unit has an item table in which are registered items, item codes and classification codes, and said settlement processing unit refers to said item table on the basis of a purchased commodity to recognize its classification code or item code, for a comparison with the available genre information of said card.

11. An electronic money apparatus according to claim 1, wherein:
said settlement processing unit has a price look-up table in which are registered price look-up codes, prices and classification codes, and said settlement processing unit refers to said price look-up table on the basis of a purchased commodity to recognize its classification code, for a comparison with the available genre information of said card.

12. An electronic money apparatus according to claim 1, wherein:
said settlement processing unit has a genre management table in which are registered apparatus numbers at settlement sites, store codes and counter codes, and said settlement processing unit refers to said genre management table on the basis of a purchased commodity to recognize its corresponding code, for a comparison with the available genre information of said card.

13. An electronic money processing method, comprising:
storing a general electronic money balance available for any genre purchase, a specific electronic money balance available for specific genre purchases, and available genre information defining the types of purchases for which the specific electronic money balance may be used, in a carriable card having an integrated circuit with a processor and a memory, the available genre information stored in said card containing a use limit flag defining the presence or absence of a use limit, and specific genre information containing at least one of an available store, an available counter, an available commodity genre and an available commodity;

transferring, one or more specific genres and a specified amount of money from the general electronic money balance of a transferor carriable card to the specific electronic money balance of a transferee carriable card, said transferring comprising
placing a transferor carriable card and a transferee carriable card in a transfer processing unit and receiving, by the transfer processing unit, an amount of money to transfer and a genre code specifying a use restriction of the money to be transferred,
acquiring a card number and a password of the transferor card and the transferee card, respectively,
setting the use limit flag of the transferee card,
registering the genre code in the transferee card, and
withdrawing the specified amount of money to be transferred from the general electronic money balance of the transferor card and adding the same to the specific electronic money balance of the transferee card, and registering the card number and the password of the transferor card in the transferee card, the transfer processing unit comprising one of a handheld computing device and a personal computer; and comparing genre information acquired from a purchased commodity or service with the available genre information of the transferee carriable card and, when a coincidence occurs, deducting a purchase amount of money from the specific electronic money balance of the transferee carriable card and, when a non-coincidence occurs, prohibiting a deduction from the specific electronic money balance.

14. An electronic money processing method according to claim 13, wherein:
the use limit flag has a flag value indicative of the absence of a limit or a flag value indicative of the presence of a limit, and the flag value indicative of the presence of a limit comprises a plurality of flag values set in accordance with different contents of the limit.

15. An electronic money processing method according to claim 13, wherein said card stores, in addition to the available genre information, transferor management information containing a card number and the code number of a transferor card.

16. An electronic money processing method according to claim 13, wherein
at every transfer from the general electronic money balance to the specific electronic money balance, the card registers the transferred specific electronic money balance and the available genre information.

17. An electronic money processing method according to claim 16, wherein:
said transferring further includes registering a card number and a code number of the transferor card into transferor management information of the transferee card, upon a transfer of a specified amount of money, and
said transferring further includes, if upon a return of a specified amount of money from the specific electronic money balance a returned card is coincident with the transferor card through a reference to the transferor management information, returning said the specified amount of money intactly to said general electronic money balance of the transferor card, and
said transferring further includes, if the returned card is not coincident with the transferor card, judging that the returned card is a third card different from the transferor card and transferring the specified amount of money paired with one or more corresponding genres to a specified electronic money balance of the third card through the acquisition of a permission for transfer based on the coincidence of collation of an input code number of the transferor card with a code number of the transferor management information.

18. An electronic money processing method according to claims 17, wherein
said transferring further includes using a fixed value as the code number registered in the transferor management information of the transferee card, upon a transfer of a specified amount of money.

19. An electronic money processing method according to claim 17, wherein
said transferring further includes varying with each transfer the code number registered in the transferor management information of the transferee card, upon a transfer of a specified amount of money.

20. An electronic money processing method according to claim 13, wherein
said transferring further includes returning a specified amount of money from the specified electronic money balance of one card to the general electronic money balance of the same card.

21. An electronic money processing method according to claim 13, wherein:
said transferring further includes registering a card number and a code number of a transferor card into transferor management information of the transferee card, at every transfer of a specified amount of money paired with a specified genre from a general electronic money balance of the transferor card to a specific electronic money balance of the transferee card, and
said transferring further includes returning the specified amount of money from the specific electronic money balance of the transferee card to the general electronic money balance of the same transferee card, through the acquisition of a permission for transfer based on a coincidence of collation of an input code number of the transferor card with a code number of the transferor management information.

22. An electronic money processing method according to claim 13, wherein:
said comparing further includes having an item table in which are registered items, item codes and classification codes, and
said comparing further includes referring to the item table on the basis of a purchased commodity to recognize its classification code or item code, for comparison with the available genre information of the card.

23. An electronic money processing method according to claim 13, wherein:
said comparing further includes having a price look-up table in which are registered price look-up codes, prices and classification codes, and
said comparing further includes referring to the price look-up table on the basis of a purchased commodity to recognize its classification code, for a comparison with the available genre information of the card.

24. An electronic money processing method according to claim 13, wherein:
said comparing further includes having a genre management table in which are registered apparatus numbers at settlement sites, store codes and counter codes, and
said comparing further includes referring to the genre management table on the basis of a purchased commodity to recognize its corresponding code, for a comparison with the available genre information of the card.

25. A carriable card having an integrated circuit, comprising:
a processor and a memory, said memory storing therein a general electronic money balance available for any genre purchase, a specific electronic money balance available for specific genre purchases, and available genre information defining the types of purchases for which the specific electronic money balance may be used,
wherein the available genre information stored in the carriable card contains a use limit flag defining the presence or absence of a use limit, and specific genre information containing at least one of an available store, an available counter, an available commodity genre and an available commodity, and
wherein the carriable card receives a specified amount of money from the general electronic money balance of another card, the specified amount of money being withdrawn from the other card and added to the specific electronic money balance of the carriable card, and the carriable card receives, from the other card, a genre code specifying a use restriction of the specified amount of money added to the specific electronic money balance and information to set the use limit flag of the carriable card.

26. A carriable card according to claim 25, wherein:
the available genre information contains a use limit flag defining the presence or absence of a use limit, and
said use limit flag has a flag value indicative of the absence of a limit or a flag value indicative of the presence of a limit, said flag value indicative of the presence of a limit comprising a plurality of flag values set in accordance with different contents of the limit, and the specific genre information contains at least one of an available store, an available counter, an available commodity genre and an available commodity.

27. A carriable card according to claim 26, wherein said card stores, in addition to the available genre information, transferor management information containing a card number and a code number of a transferor card.

28. An electronic money transfer apparatus, comprising:
a transfer processing unit transferring a specified amount of money from a general electronic money balance of a transferor carriable card to a specific electronic money balance of a transferee carriable card, the general electronic money balance being available for any genre purchase and the specific electronic money balance being available for specific genre purchases, the transferor and transferee cards each having an integrated circuit with a processor and a memory, the memory storing therein the general electronic money balance, the specific electronic money balance, and available genre information defining the types of purchases for which the specific electronic money balance may be used,
wherein the available genre information contains a use limit flag defining the presence or absence of a use limit, and specific genre information containing at least one of an available store, an available counter, an available commodity genre and an available commodity, and
wherein the transferor carriable card and the transferee carriable card are placed in the transfer processing unit, the transfer processing unit receiving the specified amount of money to transfer and a genre code specifying a use restriction of the money to be transferred, acquiring a card number and a password of the transferor card and the transferee card, respectively, setting the use limit flag of the transferee card, registering the genre code in the transferee card, withdrawing the specified amount of money to be transferred from the general electronic money balance of the transferor card and adding the same to the specific electronic money balance of the transferee card, and registering the card number and the password of the transferor card in the transferee card, the transfer processing unit comprising one of a handheld computing device and a personal computer.

29. An electronic money transfer apparatus according to claim 28, wherein
upon a transfer of a specified amount of money paired with a specified genre said transfer processing unit registers a card number and a code number of the transferor card into transferor management information of the transferee card,
if, upon a return of a specified amount of money from the specific electronic money balance, a returned card is coincident with the transferor card through a reference to the transferor management information, then said transfer processing unit returns the specified amount of money intactly to the general electronic money balance of the transferor card, and
if the returned card is not coincident with the transferor card, then said transfer processing unit judges that the returned card is a third card different from the transferor card and transfers the specified amount of money paired with one or more corresponding genres to a specified electronic money balance of the third card through the acquisition of a permission for transfer based on the coincidence of collation of an input code number of the transferor card with a code number of the transferor management information.

30. An electronic money transfer apparatus according to claim 29, wherein
upon a transfer of a specified amount of money, said transfer processing unit uses a fixed value as the code number registered in the transferor management information of the transferee card.

31. An electronic money apparatus according to claim 29, wherein
upon a transfer of a specified amount of money, said transfer processing unit varies with each transfer the code number registered in the transferor management information of the transferee card.

32. An electronic money transfer apparatus according to claim 28, wherein:
at every transfer of a specified amount of money paired with a specified genre from a general electronic money balance of the transferor card to a specific electronic money balance of the transferee card, said transfer processing unit registers a card number and a code number of the transferor card into transfer or management information of the transferee card, and
through the acquisition of a permission for transfer based on a coincidence of collation of the code number of the transferor card with a code number of the transferor management information of the transferee card, said transfer processing unit returns the specified amount of money from the specific electronic money balance of the transferee card to the general electronic money balance of the same transferee card.

33. A computer readable storage medium storing an electronic money processing program, comprising:
a transfer processing module transferring a specified amount of money from a general electronic money balance of a transferor carriable card to a specific electronic money balance of a transferee carriable card, the general electronic money balance being available for any genre purchase and the specific electronic money balance being available for specific genre purchases, the transferor and transferee cards each having an integrated circuit with a processor and a memory and storing therein the general electronic money balance, the specific electronic money balance, and available genre information defining the types of purchases for which the specific electronic money balance may be used; and
a settlement processing module comparing genre information acquired from a purchased commodity or service with the available genre information of the transferee carriable card, said settlement processing module, when a coincidence occurs, deducting the purchased amount of money from the specific electronic money balance of the transferee carriable card, said settlement processing module, when a non-coincidence occurs, prohibiting the deduction from the specific electronic money balance,
wherein the available genre information contains a use limit flag defining the presence or absence of a use limit, and specific genre information containing at least one of an available store, an available counter, an available commodity genre and an available commodity, and
wherein the transferor carriable card and the transferee carriable card are placed in the transfer processing unit, the transfer processing unit receiving the specified amount of money to transfer and a genre code specifying a use restriction of the money to be transferred, acquiring a card number and a password of the transferor card and the transferee card, respectively, setting the use limit flag of the transferee card, registering the genre code in the transferee card, withdrawing the specified amount of money to be transferred from the general electronic money balance of the transferor card and adding the same to the specific electronic money balance of the transferee card, and registering the card number and the password of the transferor card in the transferee card, the transfer processing unit comprising one of a handheld computing device and a personal computer.

34. An electronic money apparatus, comprising:

a carriable card having an integrated circuit with a processor and a memory, the memory storing therein a specific electronic money balance available for specific genre purchases, and available genre information defining the types of purchases for which the specific electronic money balance may be used; and a settlement processing unit comparing genre information acquired from a purchased commodity or a provided service with the available genre information of the carriable card, said settlement processing unit, when a coincidence occurs, deducting the purchased amount of money from the specific electronic money balance of the carriable card, and said settlement processing unit, when a non-coincidence occurs, prohibiting the deduction from the specific electronic money balance, wherein the available genre information stored in the carriable card contains a use limit flag defining the presence or absence of a use limit, and specific genre information containing at least one of an available store, an available counter, an available commodity genre and an available commodity, and wherein the carriable card receives a specified amount of money from another card, the specified amount of money being withdrawn from the other card and added to the specific electronic money balance of the carriable card, and the carriable card receives, from the other card, a genre code specifying a use restriction of the specified amount of money added to the specific electronic money balance and information to set the use limit flag of the carriable card.

35. An electronic money processing method, comprising:

storing a specific electronic money balance available for specific genre purchases and available genre information defining the types of purchases for which the specific money balance may be used, in a carriable card having an integrated circuit with a processor and a memory; and comparing genre information acquired from a purchased commodity or service with the available genre information of the carriable card and, when a coincidence occurs, deducting a purchase amount of money from the specific electronic money balance of the carriable card and, when a non-coincidence occurs, prohibiting a deduction from the specific electronic money balance, wherein the available genre information stored in the carriable card contains a use limit flag defining the presence or absence of a use limit, and specific genre information containing at least one of an available store, an available counter, an available commodity genre and an available commodity, and wherein the carriable card receives a specified amount of money from another card, the specified amount of money being withdrawn from the other card and added to the specific electronic money balance of the carriable card, and the carriable card receives, from the other card, a genre code specifying a use restriction of the specified amount of money added to the specific electronic money balance and information to set the use limit flag of the carriable card.

36. A carriable card comprising an integrated circuit with a processor and a memory, the memory storing therein a specific electronic money balance available for specific types of purchases and available genre information, the available genre information containing a use limit flag defining the presence or absence of a use limit, and specific genre information containing at least one of an available store, an available counter, an available commodity genre and an available commodity, and wherein the carriable card receives a specified amount of money from another card, the specified amount of money being withdrawn from the other card and added to the specific electronic money balance of the carriable card, and the carriable card receives, from the other card, a genre code specifying a use restriction of the specified amount of money added to the specific electronic money balance and information to set the use limit flag of the carriable card.

37. An electronic money apparatus, comprising:

a first card storing a general electronic money balance for purchasing any type of item, a specific electronic money balance for purchasing at least one designated type of item, and allowable purchases information defining the types of purchases for which the specific electronic money balance may be used;

a transfer processing unit transferring the allowable purchases information and a specified amount of money from the general electronic money balance of said first card to the specific electronic money balance of a second card; and a settlement processing unit matching the allowable purchases information from the second card with item information associated with an item to be purchased, and allowing the second card to purchase the item when a match occurs, wherein the allowable purchases information contains a use limit flag defining the presence or absence of a use limit, and specific genre information containing at least one of an available store, an available counter, an available commodity genre and an available commodity, and wherein the first card and the second card are placed in the transfer processing unit, the transfer processing unit receiving the specified amount of money to transfer and a code specifying a use restriction of the money to be transferred, acquiring a card number and a password of the first card and the second card, respectively, setting the use limit flag of the second card, registering the code in the second card, withdrawing the specified amount of money to be transferred from the general electronic money balance of the first card and adding the same to the specific electronic money balance of the second card, and registering the card number and the password of the first card in the second card, the transfer processing unit comprising one of a handheld computing device and a personal computer.

38. An electronic money processing method, comprising:

storing, on a first card, a general electronic money balance for purchasing any type of item, a specific electronic money balance for purchasing at least one designated type of item, and allowable purchases information defining the types of purchases for which the specific electronic money balance may be used;

transferring the allowable purchases information and a specified amount of money from the general electronic money balance of the first card to the specific electronic money balance of a second card; and matching the allowable purchases information from the second card with item information associated with an item to be purchased, and allowing the second card to purchase the item when a match occurs, wherein the allowable purchases information contains a use limit flag defining the presence or absence of a use limit, and specific genre information containing at least one of an available store, an available counter, an available commodity genre and an available commodity, and wherein the first card and the second card are placed in the transfer processing unit, the transfer processing unit receiving the specified amount of money to transfer and a code specifying a use restriction of the money to be transferred, acquiring a card number and a password of the first card and the second card, respectively, setting the use limit flag of the second card, registering the code in the second card, withdrawing the specified amount of money to be transferred from the general electronic money balance of the first card and adding the same to the specific electronic money balance of the second card, and registering the card number and the password of the first card in the second card, the transfer processing unit comprising one of a handheld computing device and a personal computer.

* * * * *

UNITED STATES PATENT AND TRADEMARK OFFICE
CERTIFICATE OF CORRECTION

PATENT NO.     : 6,611,819 B1
DATED          : August 26, 2003
INVENTOR(S)    : Hideo Oneda It is certified that error appears in the above-identified patent and that said Letters Patent is hereby corrected as shown below:

Column 19,
Line 12, please change "16" to -- 13 --.

Signed and Sealed this

Twenty-seventh Day of January, 2004

JON W. DUDAS
*Acting Director of the United States Patent and Trademark Office*